United States Patent
Ootsuki et al.

(10) Patent No.: US 10,392,562 B2
(45) Date of Patent: Aug. 27, 2019

(54) POLYMERIZABLE LIQUID CRYSTAL COMPOUNDS, POLYMERIZABLE LIQUID CRYSTAL COMPOSITIONS, LIQUID CRYSTALLINE POLYMERS, PHASE DIFFERENCE FILM AND DISPLAY DEVICE

(71) Applicants: JNC CORPORATION, Tokyo (JP); JNC PETROCHEMICAL CORPORATION, Tokyo (JP)

(72) Inventors: Daisuke Ootsuki, Tokyo (JP); Nagahisa Miyagawa, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/691,250

(22) Filed: Aug. 30, 2017

(65) Prior Publication Data

US 2018/0079957 A1    Mar. 22, 2018

(30) Foreign Application Priority Data

Sep. 1, 2016 (JP) ................. 2016-171066

(51) Int. Cl.

| | |
|---|---|
| G02F 1/1333 | (2006.01) |
| C09K 19/38 | (2006.01) |
| C09K 19/20 | (2006.01) |
| C09K 19/32 | (2006.01) |
| G02B 5/30 | (2006.01) |
| G02F 1/1337 | (2006.01) |
| C09K 19/04 | (2006.01) |
| C09K 19/52 | (2006.01) |

(52) U.S. Cl.
CPC ...... *C09K 19/3809* (2013.01); *C09K 19/2028* (2013.01); *C09K 19/32* (2013.01); *C09K 19/322* (2013.01); *G02B 5/3083* (2013.01); *G02F 1/133703* (2013.01); *G02F 1/133788* (2013.01); *C09K 2019/0448* (2013.01); *C09K 2019/528* (2013.01)

(58) Field of Classification Search
CPC ............ C09K 19/3809; C09K 19/2028; C09K 19/32; C09K 19/322; C09K 2019/0448; C09K 2019/528; G02F 1/1333; G02F 1/133703; G02F 1/133788
USPC ................................... 252/299.62
See application file for complete search history.

(56) References Cited

U.S. PATENT DOCUMENTS

| | | | | |
|---|---|---|---|---|
| 8,419,972 B2* | 4/2013 | Hirai | ...... | C08G 65/18 |
| | | | | 252/299.01 |
| 9,399,736 B2* | 7/2016 | Hirai | ...... | C09K 19/56 |
| 9,505,980 B2* | 11/2016 | Hirai | ...... | C09K 19/32 |
| 9,540,567 B2* | 1/2017 | Miyagawa | ...... | C09K 19/52 |
| 10,059,880 B2* | 8/2018 | Hirai | ...... | C09K 19/56 |

* cited by examiner

*Primary Examiner* — Geraldina Visconti
(74) *Attorney, Agent, or Firm* — Hogan Lovells US LLP

(57) ABSTRACT

Provided is a polymerizable liquid crystal compound represented by formula (1).

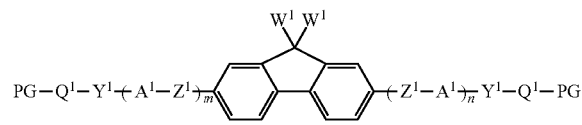

(1)

An aspect can be exemplified, in which, in formula (1), $W^1$ is hydrogen or a substituent, $A^1$ is 1,4-phenylene, 1,4-cyclohexylene or naphthalene-2,6-diyl, $Z^1$ and $Y^1$ are a connecting group, m and n each are an integer from 0 to 7, in which an expression: $3 \leq m+n \leq 8$ holds, $Q^1$ is a spacer, and PG is a polymerizable group.

10 Claims, No Drawings

POLYMERIZABLE LIQUID CRYSTAL COMPOUNDS, POLYMERIZABLE LIQUID CRYSTAL COMPOSITIONS, LIQUID CRYSTALLINE POLYMERS, PHASE DIFFERENCE FILM AND DISPLAY DEVICE

TECHNICAL FIELD

The invention relates to a polymerizable liquid crystal compound for obtaining a phase difference film having high front contrast, a polymerizable liquid crystal composition containing the polymerizable liquid crystal compound and a liquid crystal polymer.

BACKGROUND ART

A liquid crystal polymer prepared by using a polymerizable liquid crystal composition as a raw material can be utilized in a display device having a film or a device consisting of an optically anisotropic film such as a phase difference film, an optical compensation film, a reflection film, a selective reflection film, an antireflection film, a viewing angle compensation film, a liquid crystal alignment film, a polarizing device, a circularly polarizing device and an elliptically polarizing device.

For example, the phase difference film is used for displaying an image with high quality in a liquid crystal display device. A liquid crystal polymer formed by curing the polymerizable liquid crystal composition exhibits birefringence, and therefore can be used as the phase difference film. A stretched polymer film exhibiting birefringence has been so far used as the phase difference film. A study has been conducted on applying the liquid crystal polymer as the phase difference film for the purpose of ease of film formation, achievement of thin film in a film thickness and improvement of durability.

In the phase difference film formed of the liquid crystal polymer, an attempt has been made on immobilizing alignment in a state of a smectic phase for improving front contrast (Patent literature No. 1).

CITATION LIST

Patent Literature

Patent literature No. 1: JP 2016-051178 A

SUMMARY OF INVENTION

Technical Problem

In recent years, further improvement of display quality by achieving high definition of a liquid crystal display device has been required, and enhancement of front contrast than ever before has been required also in a phase difference film.

An object of the invention is to provide a phase difference film having high front contrast. Moreover, an object to be solved is to provide a polymerizable liquid crystal compound for preparing a phase difference film having high front contrast, a polymerizable liquid crystal composition containing the polymerizable liquid crystal compound and a liquid crystal polymer.

Solution to Problem

The present inventors have found that a phase difference film having high front contrast can be provided by using a liquid crystal polymer obtained by curing a polymerizable liquid crystal composition containing a specific polymerizable liquid crystal compound, and thus have completed the invention.

Item 1. A polymerizable liquid crystal compound, represented by formula (1):

Formula 1

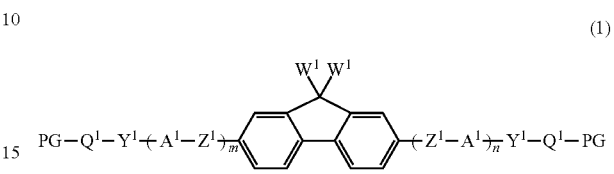

(1)

wherein, in formula (1), $W^1$ is independently hydrogen, fluorine, alkyl having 1 to 5 carbons, alkenyl having 2 to 5 carbons or fluoroalkyl having 1 to 5 carbons, $A^1$ is independently 1,4-phenylene, 1,4-cyclohexylene or naphthalene-2,6-diyl, and in the rings, at least one hydrogen may be replaced by fluorine, chlorine, trifluoromethyl, alkyl having 1 to 5 carbons, alkoxy having 1 to 5 carbons, alkoxycarbonyl having 1 to 5 carbons or alkanoyl having 1 to 5 carbons, $Z^1$ is independently —CH$_2$CH$_2$—, —COO—, —OCO—, —CH$_2$O—, —OCH$_2$—, —OCH$_2$CH$_2$O—, —CH=CHCOO—, —OCOCH=CH—, —CH$_2$CH$_2$COO—, —OCOCH$_2$CH$_2$—, —CH$_2$CH$_2$OCO— or —COOCH$_2$CH$_2$—, m and n are independently an integer from 0 to 7, in which an expression: 3≤m+n≤8 holds, $Y^1$ is independently a single bond, —O—, —COO—, —OCO— or —OCOO—, $Q^1$ is independently an single bond or alkylene having 1 to 20 carbons, and in the alkylene, at least one piece of —CH$_2$— may be replaced by —O—, —OCO—, —OCO—, —CH=CH— or —CH≡CH—, and PG is independently a functional group represented by any one of formula (PG-1) to formula (PG-9):

Formula 2

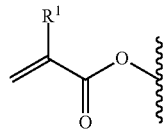
(PG-1)

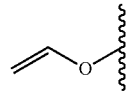
(PG-2)

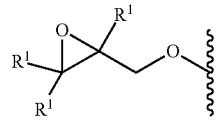
(PG-3)

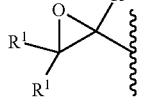
(PG-4)

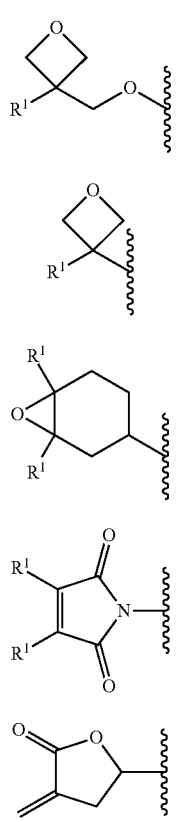

wherein, in formula (PG-1) to formula (PG-9), $R^1$ is independently hydrogen, halogen, methyl, ethyl or trifluoromethyl.

Item 2. The polymerizable liquid crystal compound according to item 1, wherein at least one of $W^1$ is alkyl having 1 to 5 carbons, and at least one of $Z^1$ is —$CH_2CH_2COO$— or —$OCOCH_2CH_2$—.

Item 3. The polymerizable liquid crystal compound according to item 1 or 2, wherein PG is a functional group represented by formula (PG-1).

Item 4. The polymerizable liquid crystal compound according to any one of items 1 to 3, wherein at least one of $Z^1$ is —$CH_2CH_2COO$—, and at least one of $Z^1$ is —$OCOCH_2CH_2$—.

Item 5. A polymerizable liquid crystal composition, containing the polymerizable liquid crystal compound according to any one of items 1 to 4.

Item 6. The polymerizable liquid crystal composition according to item 5, containing 5 to 70 parts by weight of a polymerizable liquid crystal compound represented by formula (1) when the total amount of the polymerizable liquid crystal compound in a polymerizable liquid crystal composition is taken as 100 parts by weight.

Item 7. A liquid crystal polymer, formed by curing the polymerizable liquid crystal composition according to item 5 or 6.

Item 8. The liquid crystal polymer according to item 7, wherein liquid crystal molecules are immobilized in a state in which the liquid crystal molecules are aligned by a photoalignment film.

Item 9. A phase difference film, including the liquid crystal polymer according to item 7 or 8.

Item 10. A display device, having the liquid crystal polymer according to item 7 or 8.

Advantageous Effects of Invention

A liquid crystal polymer having high front contrast can be produced by adding, to a polymerizable liquid crystal composition serving as a raw material of the liquid crystal polymer, a polymerizable liquid crystal compound characterized by having, as shown in formula (1), a fluorene skeleton and four or more ring structures of a monocycle and a fused ring in total.

DESCRIPTION OF EMBODIMENTS

In the invention, "front contrast" means a value obtained by dividing (luminance in a parallel Nicol state) by (luminance in a crossed Nicol state) upon arranging a liquid crystal polymer between two polarizing plates.

In the invention, "crossed Nicol state" means a state in which polarization axes of polarizing plates arranged facing each other are orthogonally crossed.

In the invention, "parallel Nicol state" means a state in which polarization axes of polarizing plates arranged facing each other are matched.

In the invention, "An" means birefringence of a liquid crystal polymer.

In the invention, "compound (X)" means a compound represented by formula (X). Here, X in "compound (X)" means a text, a numerical character, a symbol or the like.

In the invention, "liquid crystal compound" is a generic term for a compound that has a liquid crystal phase, and a compound that can be used as a component of a liquid crystal composition upon being mixed with any other liquid crystal compound even if the compound has no liquid crystal phase alone.

In the invention, "polymerizable functional group" means a functional group that, when a compound has the group therein, is polymerized by a means such as light, heat and a catalyst to change the compound into a polymer having larger molecular weight.

In the invention, "monofunctional compound" means a compound having one polymerizable functional group.

In the invention, "polyfunctional compound" means a compound having a plurality of polymerizable functional groups.

In the invention, "X functional compound" means a compound having X pieces of polymerizable functional groups.

Here, X in "X functional compound" represents an integer.

In the invention, "polymerizable compound" means a compound having at least one polymerizable functional group.

In the invention, "polymerizable liquid crystal compound" means a compound being a liquid crystal compound and a polymerizable compound.

In the invention, "non-liquid crystal polymerizable compound" means a polymerizable compound being not a liquid crystal compound.

In the invention, "polymerizable liquid crystal composition" means a composition containing a polymerizable compound and a liquid crystal compound, or a composition containing "polymerizable liquid crystal compound."

In the invention, "liquid crystal polymerization film" means a portion of a polymer of the polymerizable liquid crystal composition, obtained by polymerizing the polymerizable liquid crystal composition on a substrate.

In the invention, "liquid crystal polymer with a substrate" means a material containing a substrate, obtained by polymerizing a polymerizable liquid crystal composition on the substrate.

In the invention, "liquid crystal polymer" is a generic term for a liquid crystal polymerization film and a liquid crystal polymer with a substrate.

In the invention, "tilt angle" means an angle between a direction of alignment of liquid crystal molecules and a plane of a support substrate.

In the invention, "homogeneous alignment" means alignment with the tilt angle from 0 degrees to 5 degrees.

In the invention, "homeotropic alignment" means alignment with the tilt angle from 85 degrees to 90 degrees.

In the invention, "tilt alignment" means a state in which a direction of alignment of liquid crystal molecules in a major axis direction rises up vertically from parallel relative to a substrate accordingly as the liquid crystal molecules are separated from the substrate.

In the invention, "twist alignment" means a state in which a direction of alignment of liquid crystal molecules in a major axis direction is parallel to a substrate, and the liquid crystal molecules are twisted stepwise with a helical axis as a center accordingly as the liquid crystal molecules are separated from the substrate.

In the invention, "room temperature" means a temperature from 15° C. to 35° C.

When the functional group described below is described in the chemical formula, a wavy line part means a position of bonding with the functional group. C described below herein represents an arbitrary atom or functional part.

Formula 3

Polymerizable Liquid Crystal Compound

From a polymerizable liquid crystal composition containing compound (1) according to the invention, a liquid crystal polymer having large birefringence, and high front contrast can be produced.

Even if the polymerizable liquid crystal composition containing compound (1) according to the invention contains a large amount of polymerizable liquid crystal compound, no crystal is formed in the polymerizable liquid crystal composition even after a solvent is removed. Moreover, a liquid crystal polymer having no alignment defect can be obtained by using the polymerizable liquid crystal composition as a raw material. In the liquid crystal polymer, retardation Re is not varied depending on an incident point in an incidence plane of the liquid crystal polymer.

Formula 4

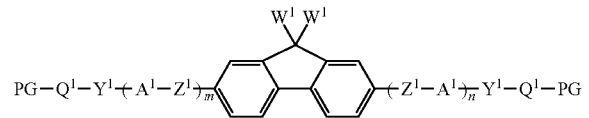

(1)

In formula (1) described above, $W^1$ is independently hydrogen, fluorine, alkyl having 1 to 5 carbons, alkenyl having 2 to 5 carbons or fluoroalkyl having 1 to 5 carbons. When at least one of $W^1$ is alkyl having 1 to 5 carbons, the liquid crystal phase in the polymerizable liquid crystal composition is easily developed, and phase separation from any other liquid crystal compound and an organic solvent in the polymerizable liquid crystal composition is hard to be caused, and therefore such a case is further preferred.

$A^1$ is independently 1,4-phenylene, 1,4-cyclohexylene or naphthalene-2,6-diyl, and in the rings, at least one hydrogen may be replaced by fluorine, chlorine, trifluoromethyl, alkyl having 1 to 5 carbons, alkoxy having 1 to 5 carbons, alkoxycarbonyl having 1 to 5 carbons or alkanoyl having 1 to 5 carbons.

In formula (1), $Z^1$ is independently —CH$_2$CH$_2$—, —COO—, —OCO—, —CH$_2$O—, —OCH$_2$—, —OCH$_2$CH$_2$O—, —CH═CHCOO—, —OCOCH═CH—, —CH$_2$CH$_2$COO—, —OCOCH$_2$CH$_2$—, —CH$_2$CH$_2$OCO— or —COOCH$_2$CH$_2$—. When at least one of $Z^1$ is —CH$_2$CH$_2$COO— or —OCOCH$_2$CH$_2$—, phase separation from any other liquid crystal compound and the organic solvent in the polymerizable liquid crystal composition is hard to be caused, and therefore such a case is further preferred.

Then, m and n are independently an integer from 0 to 7, and an expression: 3≤m+n≤8 holds. In order to enhance the front contrast, an expression: m+n≥3 preferably holds, and in order to achieve difficulty in the phase separation from any other liquid crystal compound and the organic solvent in the polymerizable liquid crystal composition, an expression: m+n≤8 preferably holds.

In formula (1), $Y^1$ is independently a single bond, —O—, —COO—, —OCO— or —OCOO—, and $Q^1$ is independently an single bond or alkylene having 1 to 20 carbons, and in the alkylene, at least one piece of —CH$_2$— may be replaced by —O—, —OCO— or —OCO—. When $Q^1$ is alkylene having 1 to 20 carbons, the liquid crystal phase of the polymerizable liquid crystal composition is easily developed, and the phase separation from any other liquid crystal compound and the organic solvent is hard to be caused.

PG is independently a functional group represented by any one of formula (PG-1) to formula (PG-9).

The functional group represented by formula (PG-1), formula (PG-2), formula (PG-8) and formula (PG-9) has an electron withdrawing group in alkene, and therefore is a polymerizable functional group that is polymerized by various means to change the compound to a polymer having larger molecular weight.

The functional group represented by formula (PG-3) to formula (PG-7) has an ether ring having a strain, and therefore is a polymerizable functional group that is polymerized by various means to change the compound to a polymer having larger molecular weight.

Formula 5

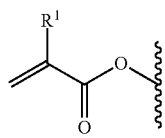

(PG-1)

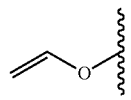

(PG-2)

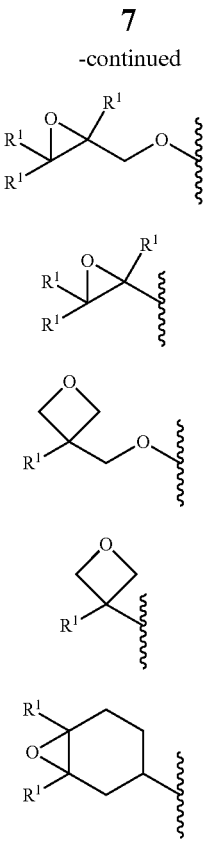

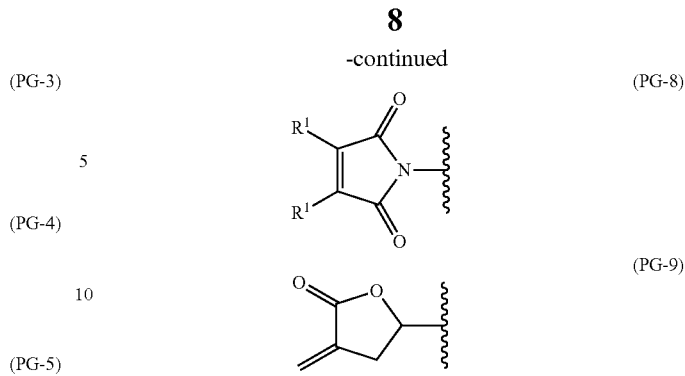

In formula (PG-1) to formula (PG-9), $R^1$ is independently hydrogen, halogen, methyl, ethyl or trifluoromethyl. The halogen is preferably fluorine, chlorine, bromine or iodine.

As the functional group represented by formula (PG-1) to formula (PG-9), a suitable functional group can be selected according to conditions of producing a film. For example, when a film is prepared by photo-curing that is ordinarily used, in view of high curability, solubility in a solvent, ease of handling and so forth, an acrylic group, a methacrylic group or the like represented by formula (PG-1) is preferred.

In the polymerizable liquid crystal compound represented by formula (1), in view of compatibility with other liquid crystal compounds and the organic solvent, preferred examples include a compound represented by formula (1-1-1) to formula (1-1-10) and formula (1-2-1) to formula (1-2-7) each.

Formula 6

(1-1-1)

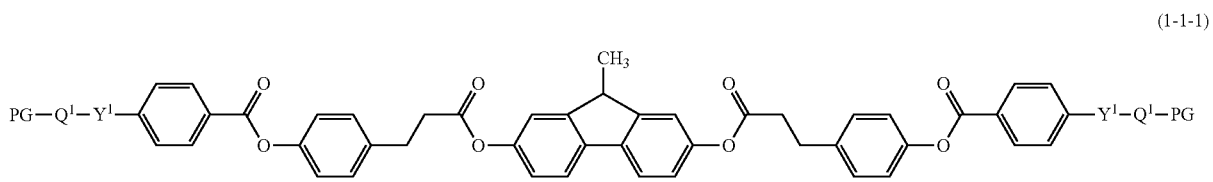

(1-1-2)

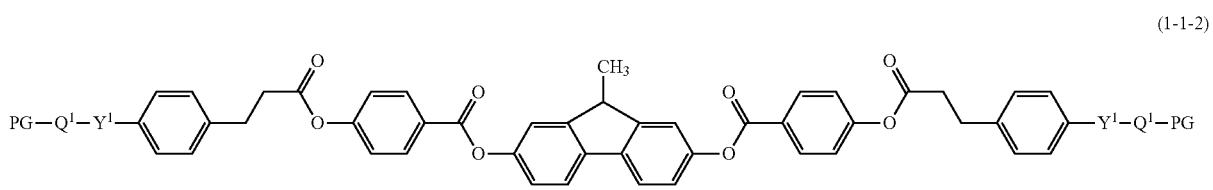

(1-1-3)

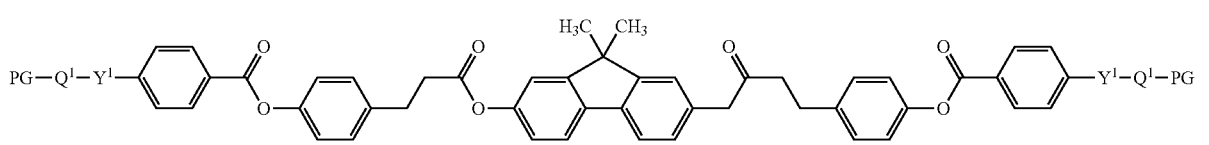

(1-1-4)

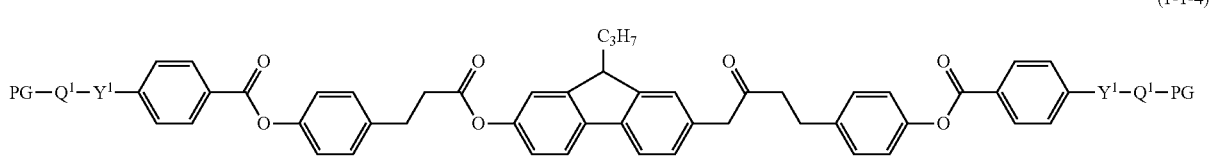

-continued
(1-1-5)
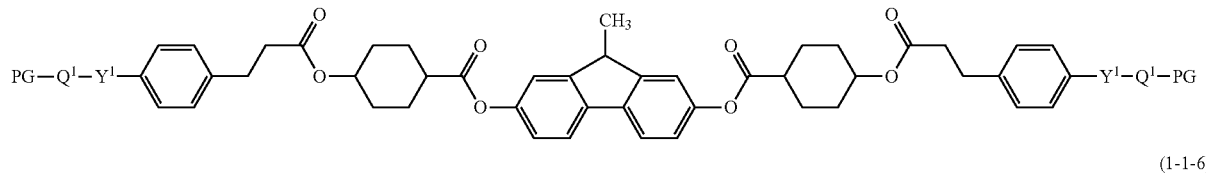
(1-1-6)
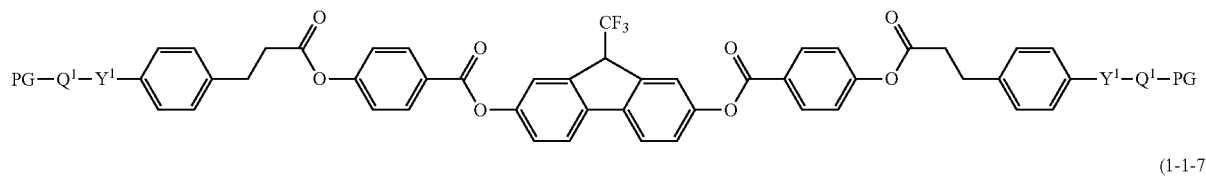
(1-1-7)
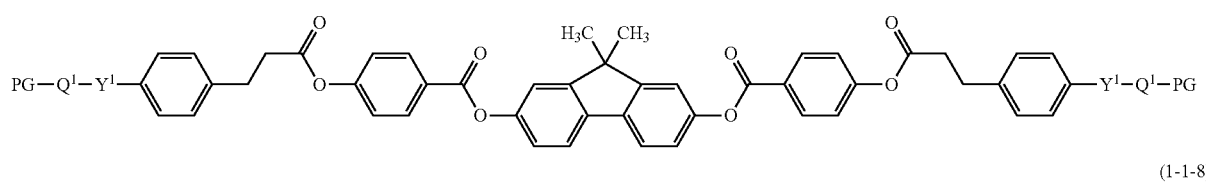
(1-1-8)
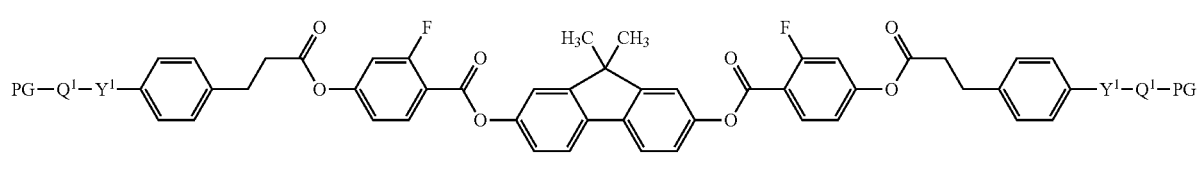
(1-1-9)
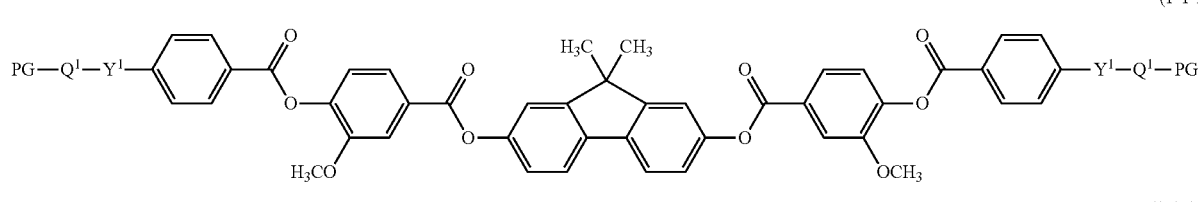
(1-1-10)
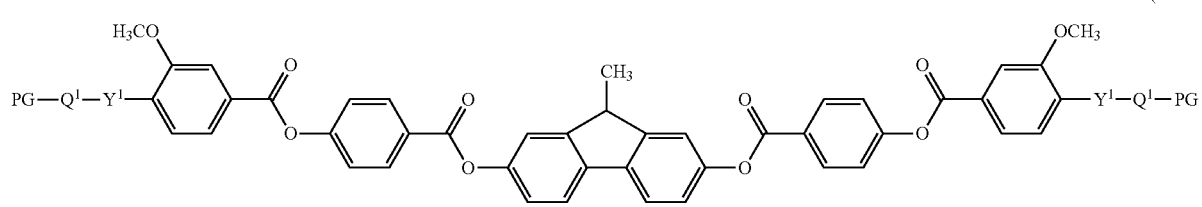
Formula 7
(1-2-1)
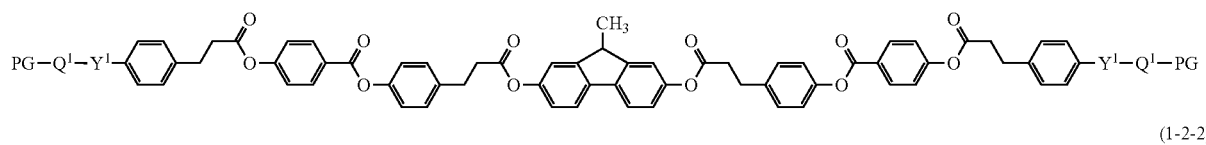
(1-2-2)
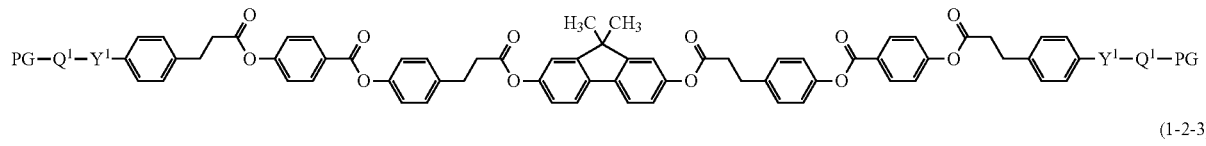
(1-2-3)
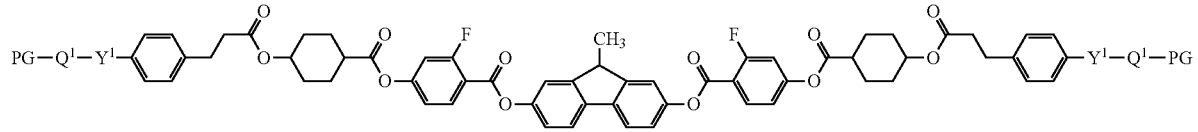

(1-2-4)
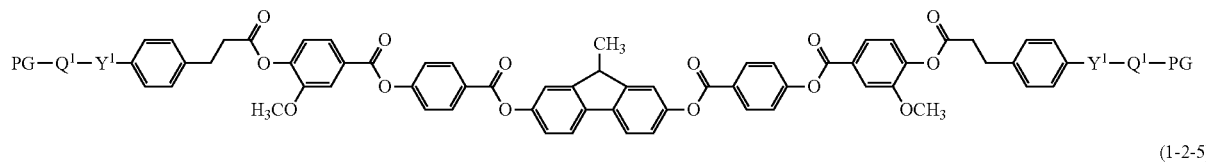

(1-2-5)
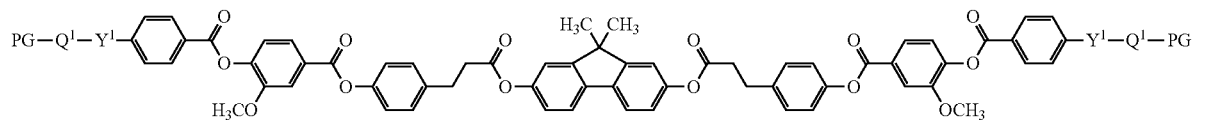

(1-2-6)
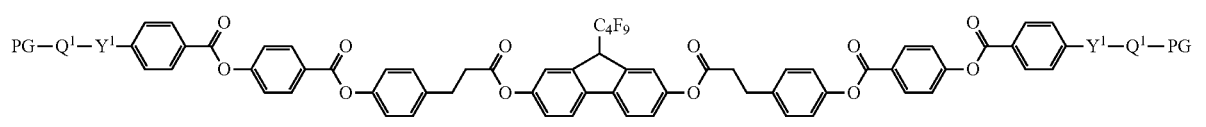

(1-2-7)
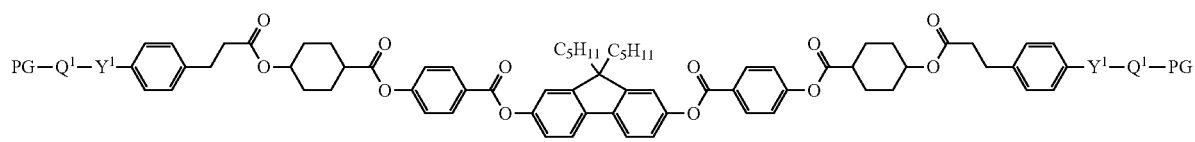

In formula (1-1-1) to formula (1-1-10) or formula (1-2-1) to formula (1-2-7), $Y^1$ is independently a single bond, —O—, —COO—, —OCO— or —OCOO—, $Q^1$ is independently an single bond or alkylene having 1 to 20 carbons, and in the alkylene, at least one piece of —CH$_2$— may be replaced by —O—, —OCO— or —OCO—, and PG is independently any one of functional groups represented by formula (PG-1) to formula (PG-9) described above.

Compound (1) can be synthesized by combining a method of publicly-known synthetic organic chemistry. For example, compound (1) can be synthesized according to a reaction scheme shown in Example 1 described below by using, as a starting material, a material synthesized in a manner similar to a method described in ACS Medicinal Chemistry Letters, 2010, 1(7), pp 345-349.

Polymerizable Liquid Crystal Composition

A polymerizable liquid crystal composition of the invention contains one or more compound (1). From a viewpoint of improvement of front contrast characteristics, when the total amount of the polymerizable liquid crystal compound in the polymerizable liquid crystal composition taken as 100 parts by weight, the polymerizable liquid crystal composition preferably contains 5 to 70 parts by weight of compound (1), and further preferably contains 10 to 50 parts by weight of compound (1). Moreover, the polymerizable liquid crystal composition of the invention preferably contains 1.5 to 50% by weight of compound (1), and further preferably contains 3 to 30% by weight of compound (1) based on the total amount of the polymerizable liquid crystal composition.

The polymerizable liquid crystal composition of the invention may contain a polymerizable liquid crystal compound other than the polymerizable liquid crystal compound represented by compound (1). As an example of the polymerizable liquid crystal compound, from viewpoints of ability of occurrence of the liquid crystal phase of the polymerizable liquid crystal composition, and compatibility with compound (1) and the organic solvent; a compound represented by formula (M) described below is preferred.

Formula 8

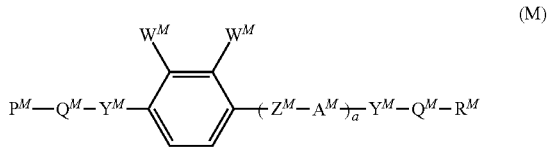

(M)

In formula (M), $A^M$ is independently 1,4-phenylene, 1,4-cyclohexylene, naphthalene-2,6-diyl or fluorene-2,7-diyl, in which, in 1,4-phenylene, naphthalene-2,6-diyl or fluorene-2,7-diyl, at least one hydrogen may be replaced by fluorine, chlorine, cyano, formyl, alkyl having 1 to 5 carbons, alkoxy having 1 to 5 carbons, alkenyl having 2 to 5 carbons, alkoxycarbonyl having 1 to 5 carbons, alkanoyl having 1 to 5 carbons, fluoroalkyl having 1 to 5 carbons or a group represented by —$Y^M$-$Q^M$-$P^M$, $Z^M$ is independently a single bond, —CH$_2$CH$_2$—, —COO—, —OCO—, —C≡C—, —CH═CHCOO—, —OCOCH═CH—, —CH$_2$CH$_2$COO—, —OCOCH$_2$CH$_2$—, —CH$_2$CH$_2$OCO— or —COOCH$_2$CH$_2$—, a is an integer of 1 or 2, $W^M$ is independently hydrogen, fluorine, chlorine, formyl, alkyl having 1 to 5 carbons, alkenyl having 2 to 5 carbons, alkoxycarbonyl having 1 to 5 carbons, alkanoyl having 1 to 5 carbons or fluoroalkyl having 1 to 5 carbons, $Y^M$ is independently a single bond, —O—, —COO—, —OCO— or —OCOO—, $Q^M$ is independently a single bond or alkylene having 1 to 20 carbons, and in the alkylene, at least one piece of —CH$_2$— may be replaced by —O—, —OCO—, —OCO—, —CH═CH— or —CH≡CH—, $P^M$ is independently a functional group represented by any one of formula (PG-1) to formula (PG-9), and $R^M$ is fluorine, chlorine, cyano, alkyl having 1 to 5 carbons, alkoxy having 2 to 5 carbons, alkenyl having 1 to 5 carbons, alkoxycarbonyl having 1 to 5 carbons, alkanoyl having 1 to 5 carbons, fluoroalkyl having 1 to 5 carbons or a functional group represented by any one of formula (PG-1) to formulas (PG-9).

Formula 9

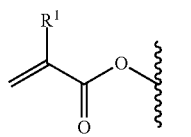
(PG-1)

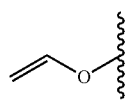
(PG-2)

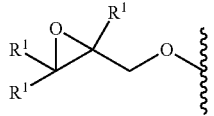
(PG-3)

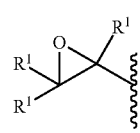
(PG-4)

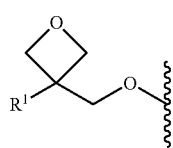
(PG-5)

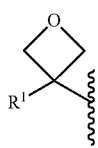
(PG-6)

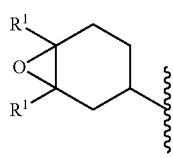
(PG-7)

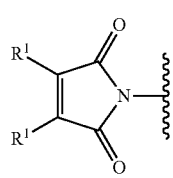
(PG-8)

-continued

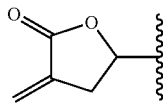
(PG-9)

In formula (PG-1) to formula (PG-9), $R^1$ is independently hydrogen, halogen, methyl, ethyl or trifluoromethyl. The halogen is preferably fluorine, chlorine, bromine or iodine.

In formula (M), when $R^M$ is fluorine, chlorine, cyano, alkyl having 1 to 5 carbons, alkoxy having 1 to 5 carbons, alkenyl having 2 to 5 carbons, alkoxycarbonyl having 1 to 5 carbons, alkanoyl having 1 to 5 carbons or fluoroalkyl having 1 to 5 carbons, compound (M) is a monofunctional compound.

When compound (M) is the monofunctional compound, in the polymerizable liquid crystal composition to which compound (M) is added, a liquid crystal temperature range, optical characteristics and alignability are easily controlled. If an amount of addition of compound (M) being the monofunctional compound is large, the polymerizable liquid crystal composition tends to be high in the tilt angle, and homeotropic alignment is easily obtained. When $R^M$ is not the functional group represented by any one of formula (PG-1) to formulas (PG-9), compound (M) is formed into the monofunctional compound.

Addition of the polyfunctional compound to the polymerizable liquid crystal composition results in improving mechanical strength or chemical resistance of the liquid crystal polymer, or both thereof. For example, a polymer of the polymerizable liquid crystal composition to which compound (M) being a bifunctional compound is added is formed into a three-dimensional structure. If compound (M) being the bifunctional compound is added thereto, the polymer of the polymerizable liquid crystal composition, formed into the three-dimensional structure, becomes harder. In addition, when $R^M$ is the functional group represented by any one of formula (PG-1) to formulas (PG-9), compound (M) is formed into the bifunctional compound.

If improvement of the front contrast of the liquid crystal polymer, induction of the liquid crystal phase of the polymerizable liquid crystal composition serving as the raw material of the liquid crystal polymer, and phase separation from any other liquid crystal compound and the organic solvent in the composition are taken into consideration, a total of the compounds represented by formula (M) in the polymerizable liquid crystal composition is preferably 30 to 95% by weight, and further preferably 30 to 70% by weight, based on the total weight of the compounds represented by formula (1) and formula (M).

Examples of a preferred compound represented by formula (M) will be shown below.

Formula 10
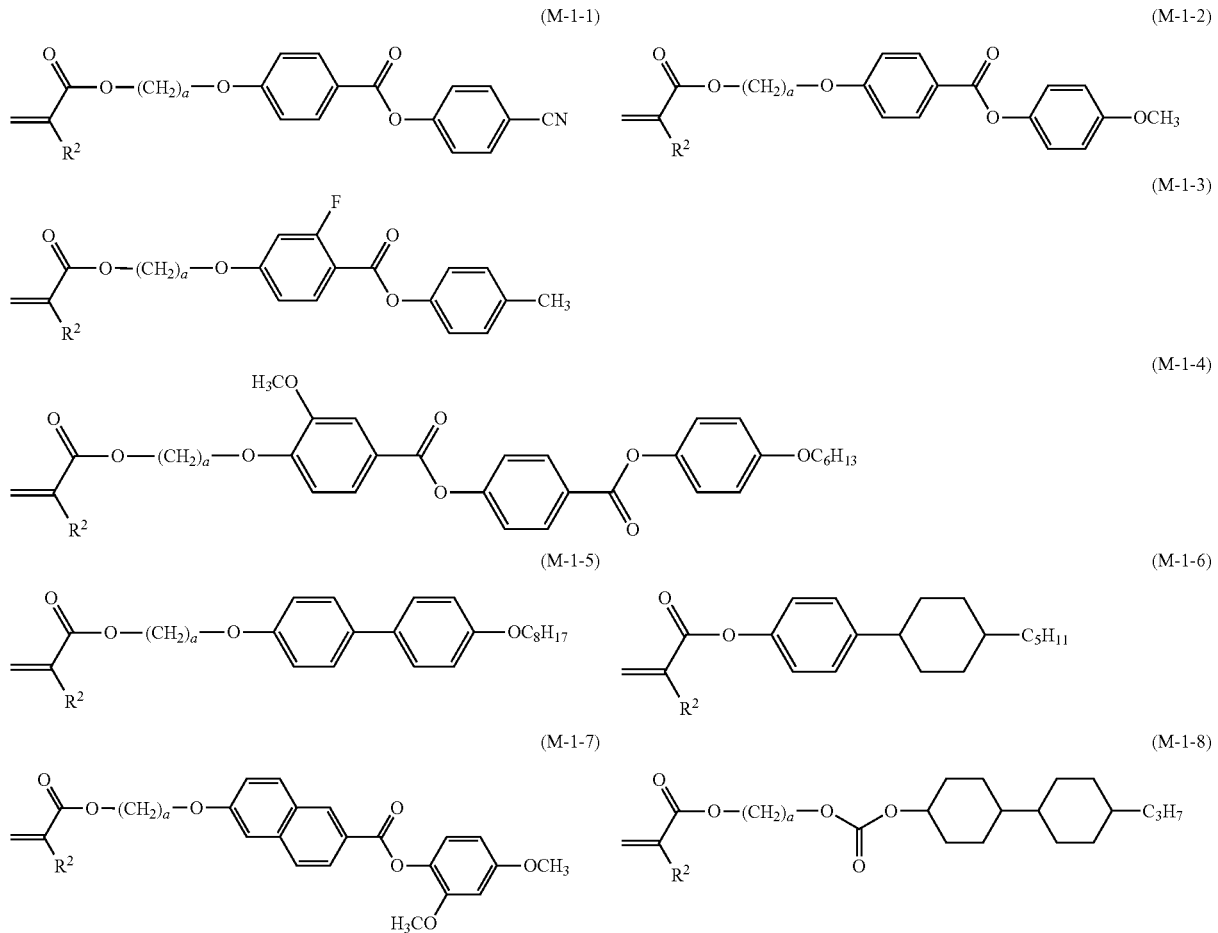
Formula 11
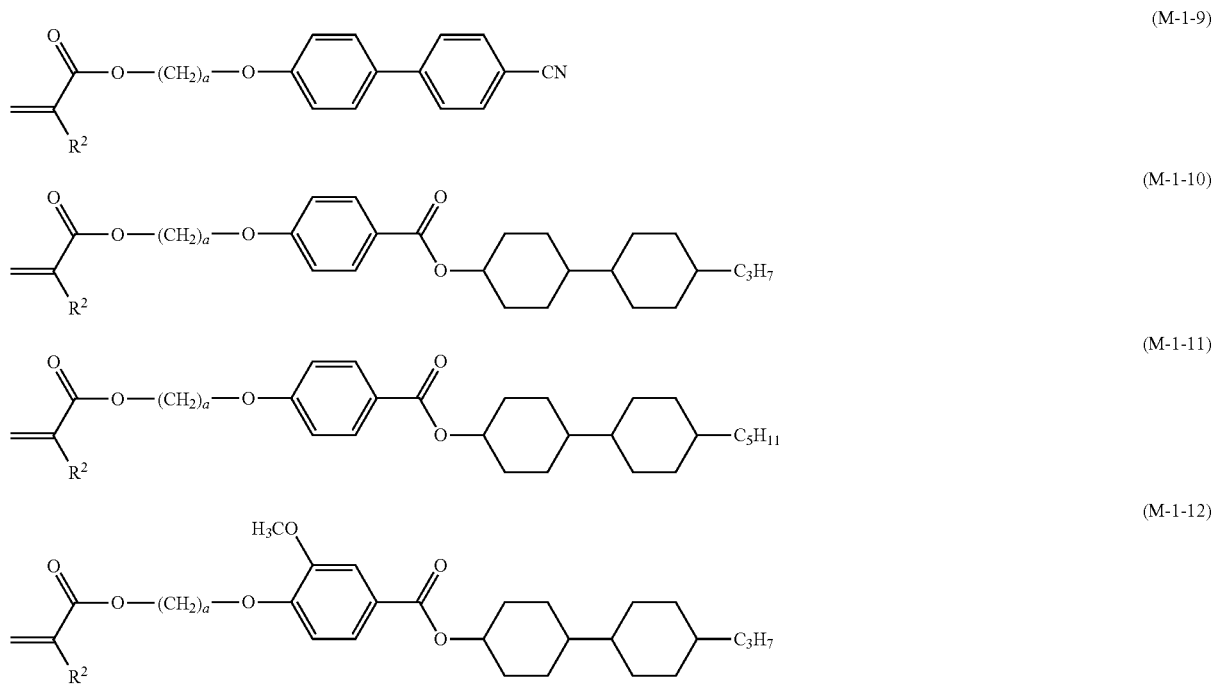

(M-1-13)
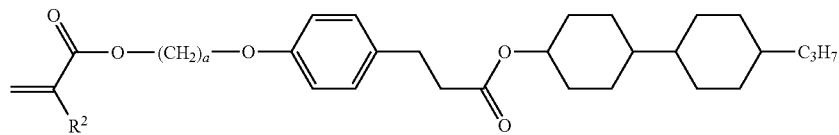
(M-1-14)
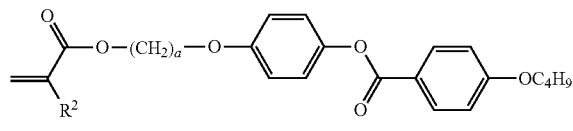
(M-1-15)
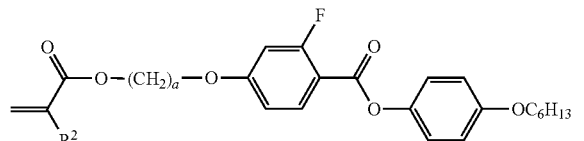
(M-1-16)
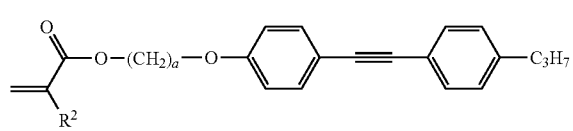
(M-1-17)
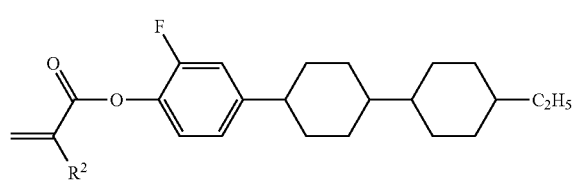
(M-1-18)
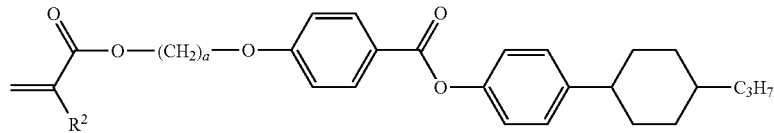
Formula 12
(M-2-1)
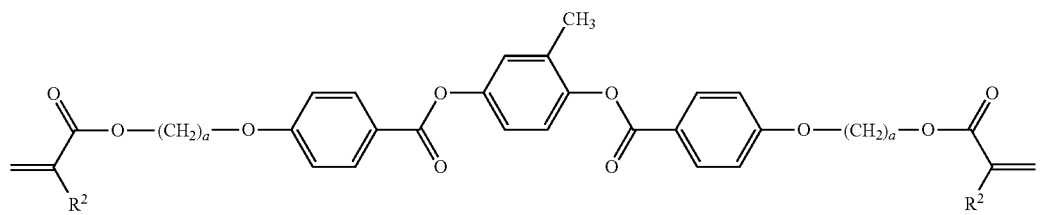
(M-2-2)
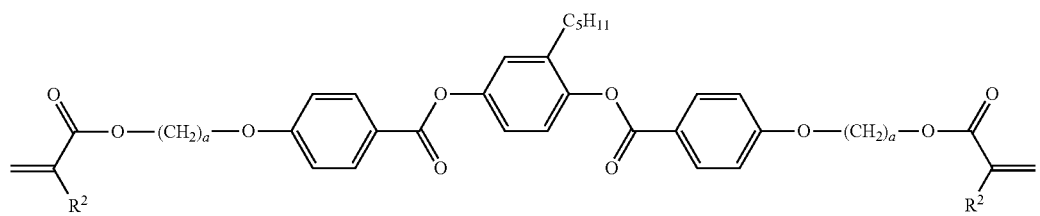
(M-2-3)
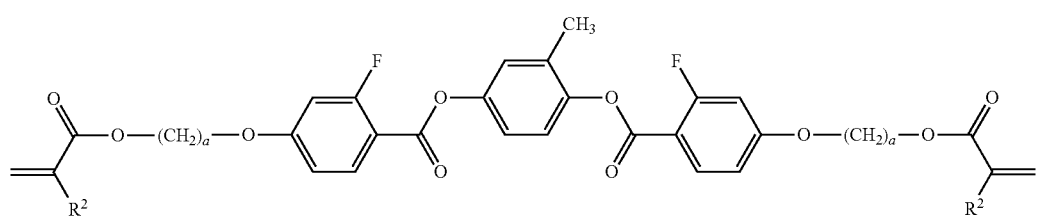
(M-2-4)
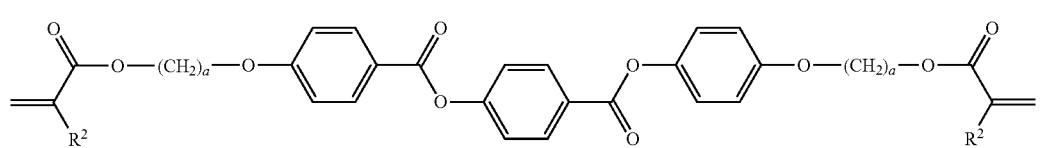

-continued
(M-2-5)
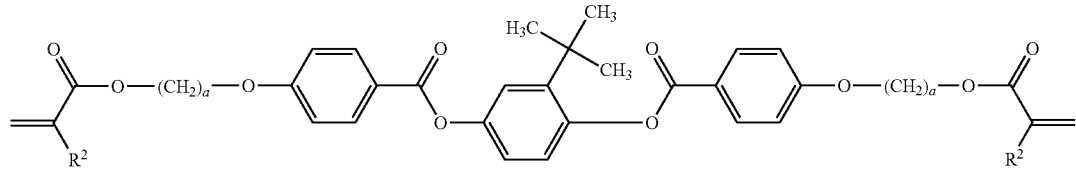
(M-2-6)
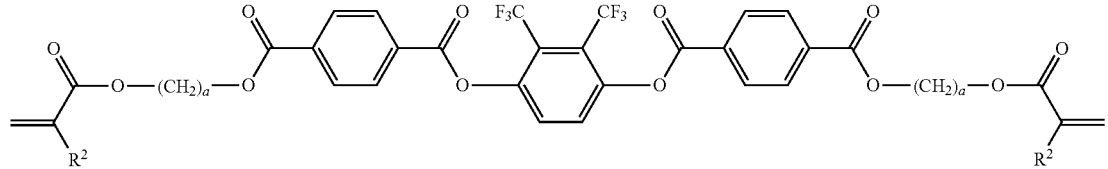
(M-2-7)
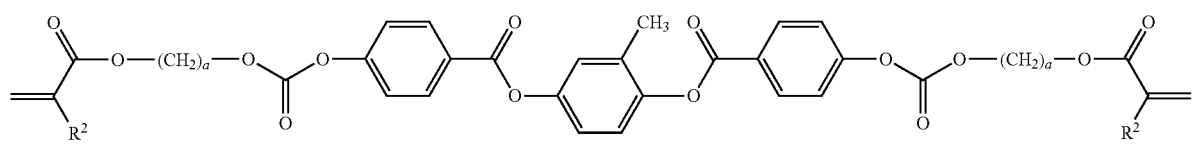
(M-2-8)
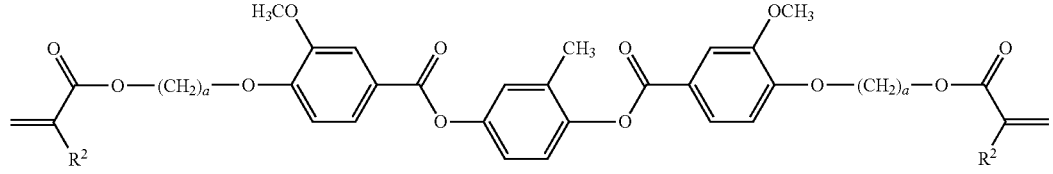
(M-2-9)
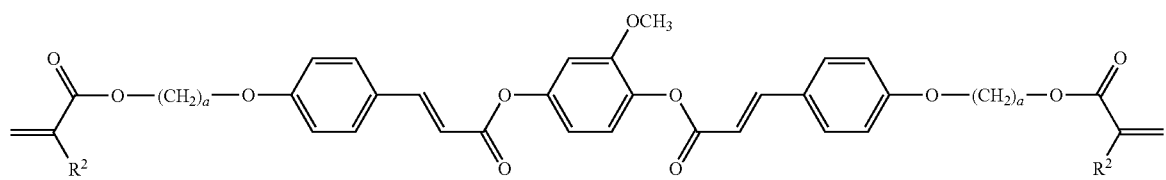
(M-2-10)
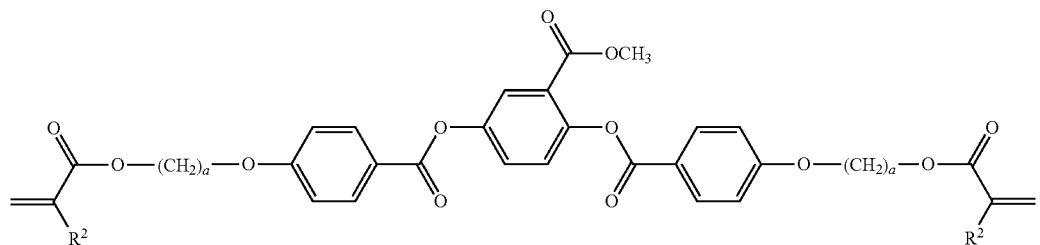
Formula 13
(M-2-11)
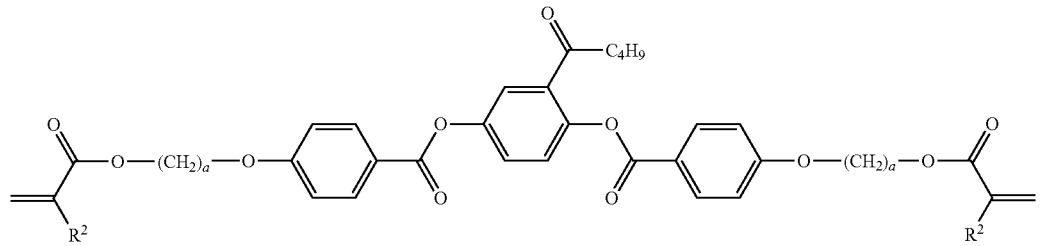

-continued
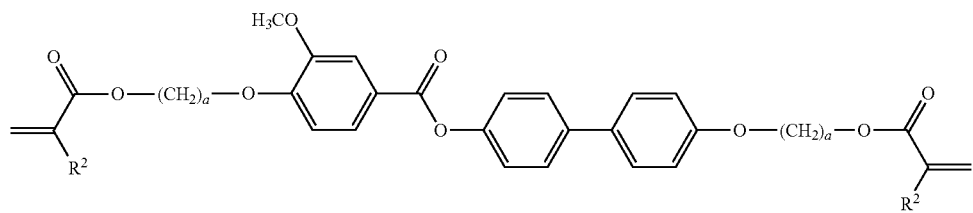
(M-2-12)
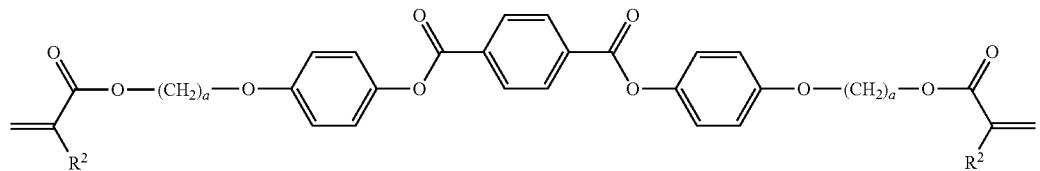
(M-2-13)
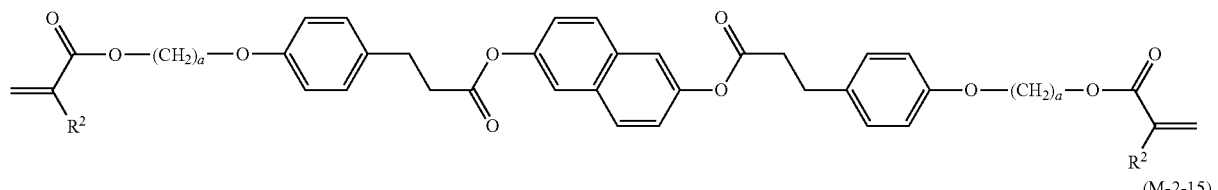
(M-2-14)
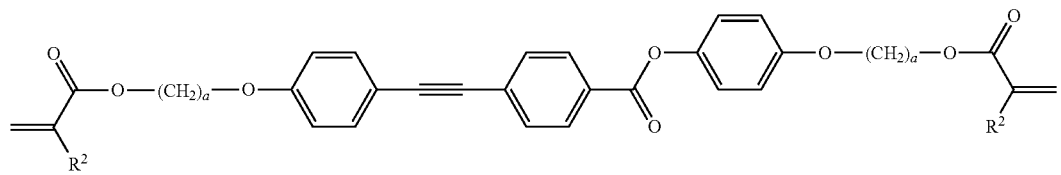
(M-2-15)
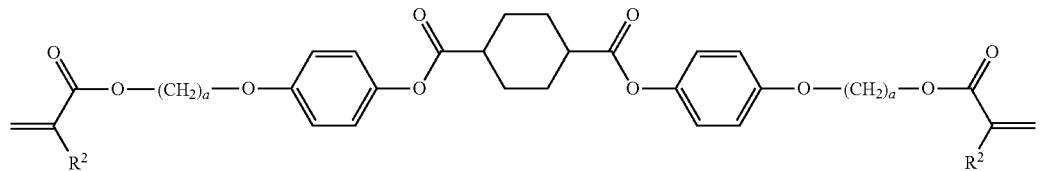
(M-2-16)
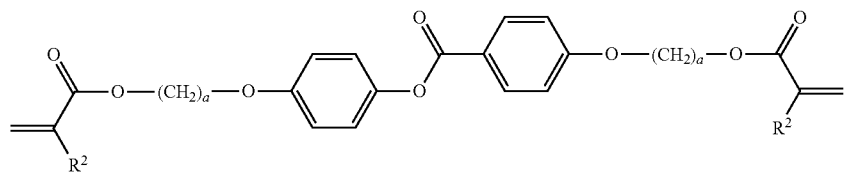
(M-2-17)
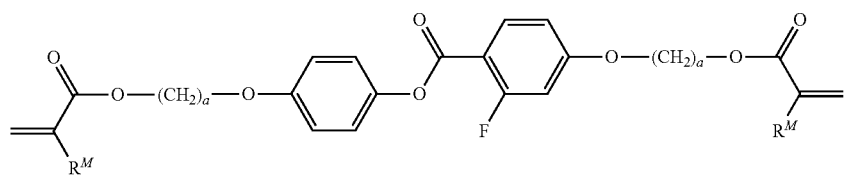
(M-2-18)
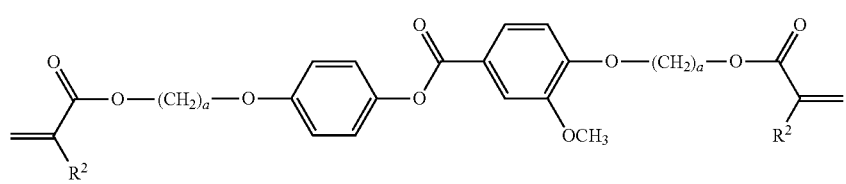
(M-2-19)

-continued
(M-2-20)
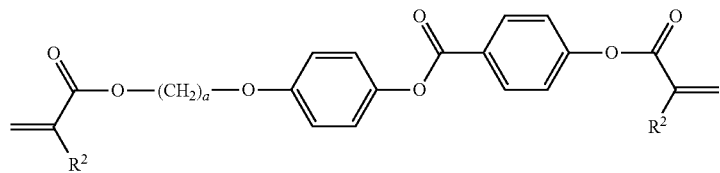
Formula 14
(M-2-21)
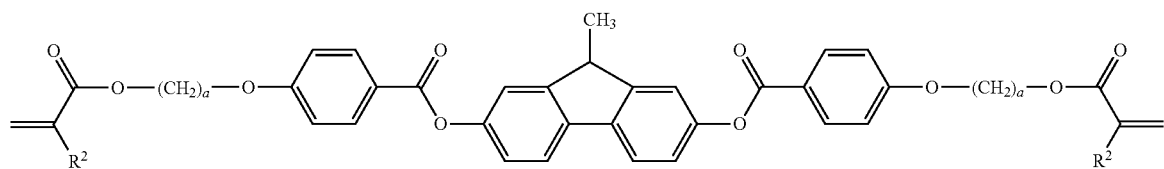
(M-2-22)
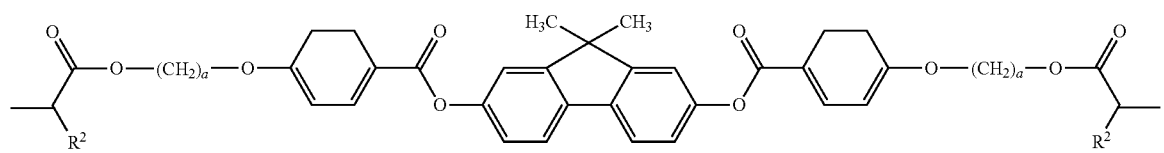
(M-2-23)
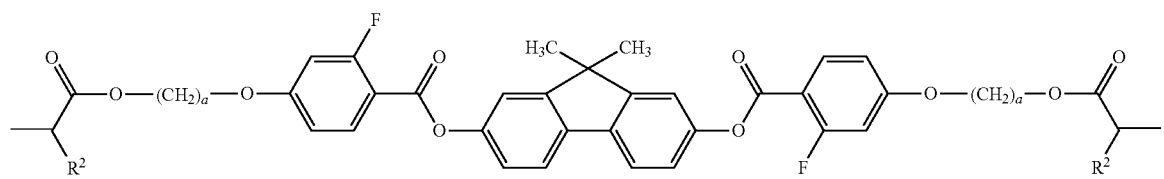
(M-2-24)
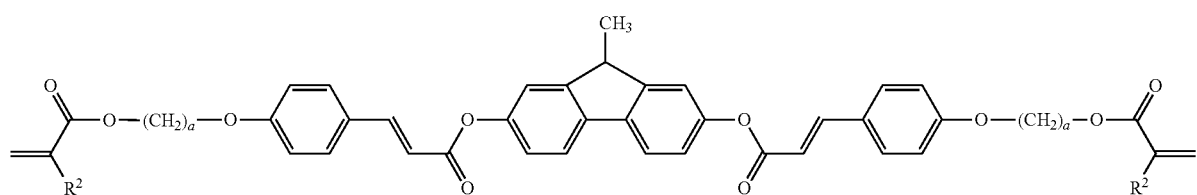
(M-2-25)
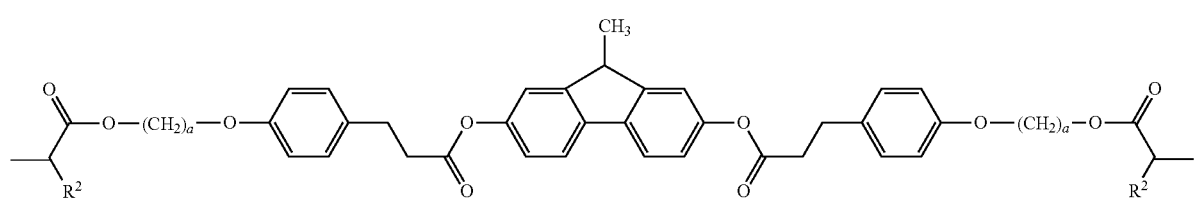
(M-2-26)
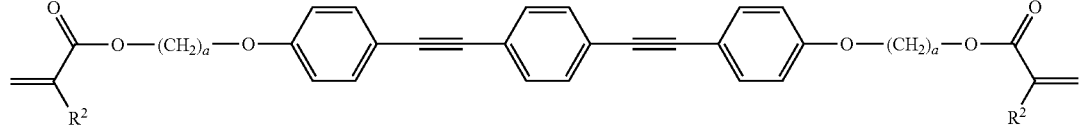
(M-2-27)
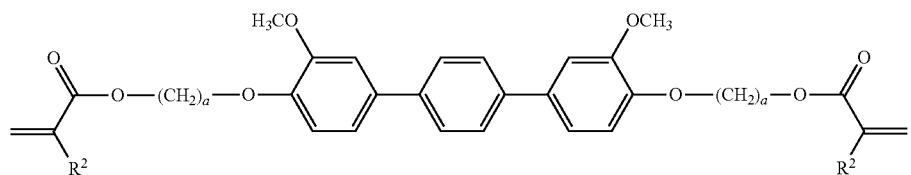

-continued
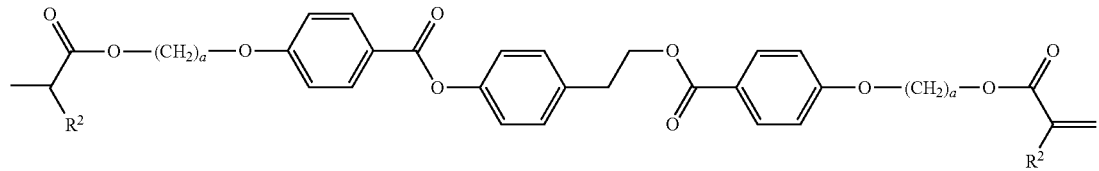
(M-2-28)
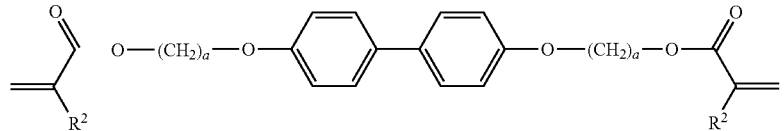
(M-2-29)
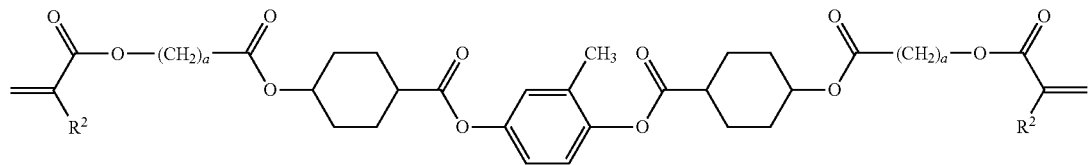
(M-2-30)
Formula 15
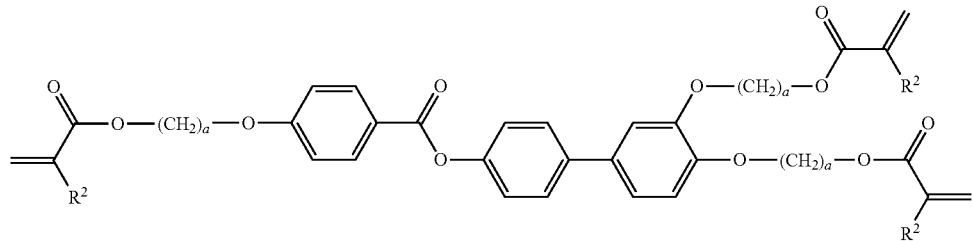
(M-3-1)
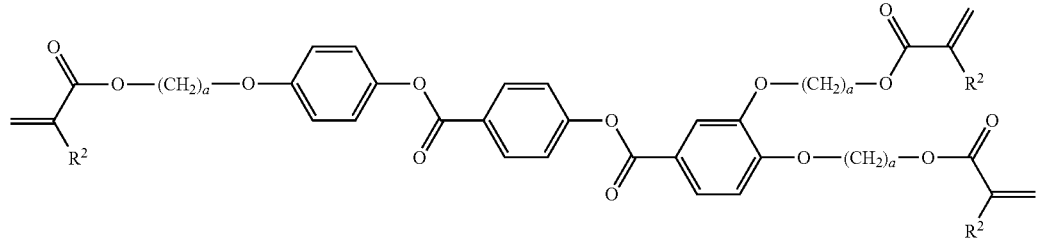
(M-3-2)
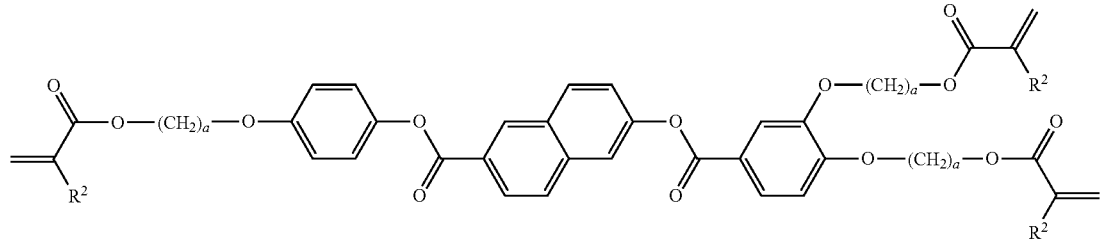
(M-3-3)
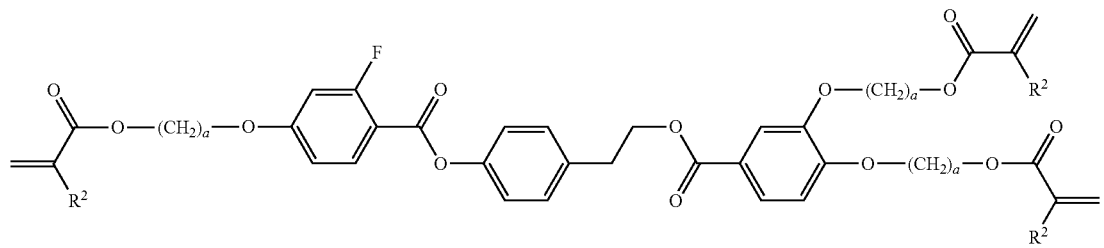
(M-3-4)

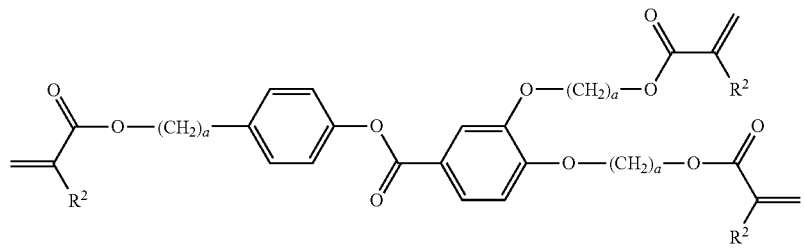
(M-3-5)

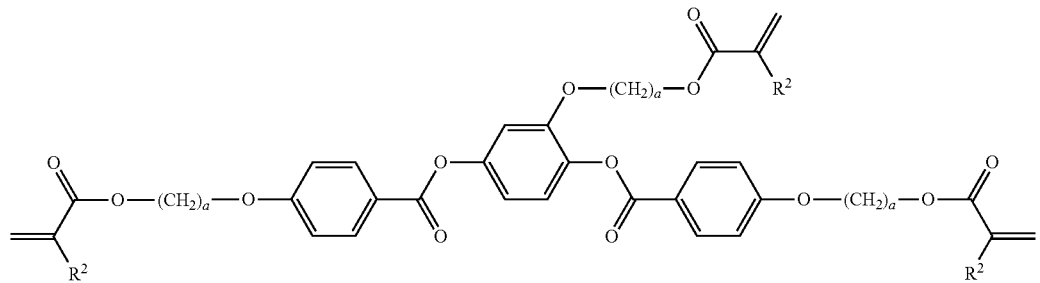
(M-3-6)

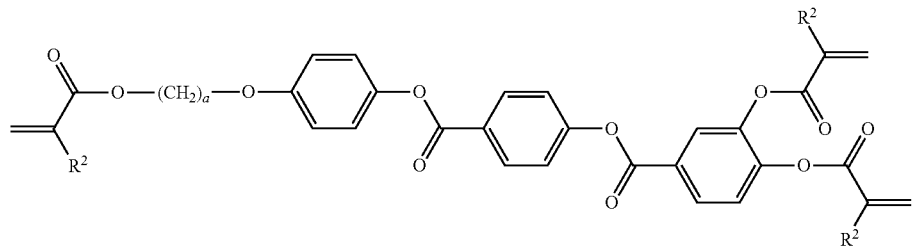
(M-3-7)

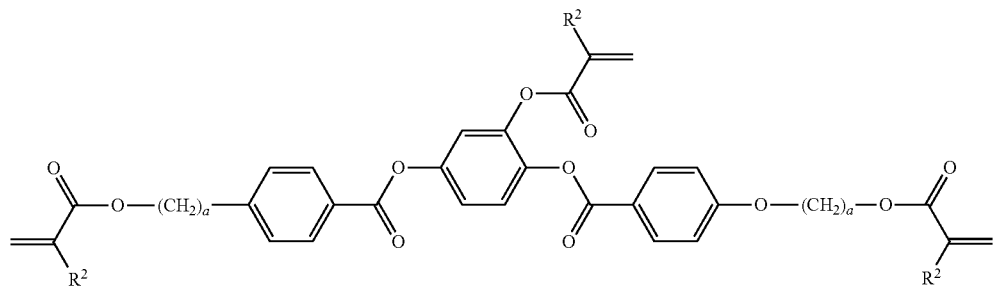
(M-3-8)

In formulas (M-1-1) to (M-1-18), formulas (M-2-1) to (M-2-30) and formulas (M-3-1) to (M-3-8), $R^2$ is independently hydrogen or methyl, and a is independently an integer from 1 to 12.

The polymerizable liquid crystal composition of the invention is coated onto a plastics substrate subjected to alignment treatment such as rubbing treatment or a support substrate a surface of which is covered with a thin film of plastic to form a film into a homogeneously-aligned or tilt-aligned liquid crystal polymer.

Additives to Polymerizable Liquid Crystal Composition

One kind or more kinds of additives may be added to the polymerizable liquid crystal composition of the invention.

Addition of a surfactant to the polymerizable liquid crystal composition results in improving smoothness of the liquid crystal polymer. Addition of a nonionic surfactant to the polymerizable liquid crystal composition results in further improving the smoothness of the liquid crystal polymer. The nonionic surfactant is effective in suppressing the tilt alignment on a side of an air interface of the liquid crystal polymer.

A silicone-based nonionic surfactant, a fluorine-based nonionic surfactant, a vinyl-based nonionic surfactant, a hydrocarbon-based nonionic surfactant or the like is the nonionic surfactant.

The surfactant is effective in uniting with other polymerizable liquid crystal compounds, and therefore the surfactant being the polymerizable compound is preferably added to the polymerizable liquid crystal composition. From a viewpoint of reactivity with the polymerizable liquid crystal compound, as the surfactant, a surfactant to start a polymerization reaction with ultraviolet light is preferred.

The liquid crystal polymer is easily uniformly aligned, and applicability of the polymerizable liquid crystal composition is improved, and therefore the surfactant in the polymerizable liquid crystal composition is preferably 0.0001 to 0.5% by weight, and further preferably 0.01 to 0.2% by weight, based on the total amount of the polymerizable liquid crystal composition.

Specific examples of the surfactant include an ionic surfactant, a silicone-based nonionic surfactant, a fluorine-based nonionic surfactant, a vinyl-based nonionic surfactant and other nonionic surfactants.

Specific examples of the ionic surfactant include a titanate-based compound, imidazoline, a quaternary ammonium salt, alkylamine oxide, a polyamine derivative, a polyoxyethylene-polyoxypropylene condensate, polyethylene glycol and ester thereof, sodium lauryl sulfate, ammonium lauryl sulfate, lauryl sulfate amines, alkyl-substituted aromatic sulfonate, alkyl phosphate, an aliphatic or aromatic sulfonic acid-formalin condensate, lauryl amidopropyl betaine, lauryl aminoacetate betaine, polyethyleneglycol fatty acid esters, polyoxyethylene alkylamine, perfluoroalkyl sulfonate and perfluoroalkyl carboxylate.

Specific examples of the silicone-based nonionic surfactant include a straight-chain polymer formed of siloxane bond, and a compound in which an organic group such as polyether and a long-chain alkyl is introduced into a side chain and/or a terminal.

Specific examples of the fluorine-based nonionic surfactant include a compound having a perfluoroalkyl group having 2 to 7 carbons or a perfluoro alkenyl group having 2 to 7 carbons.

Specific examples of the vinyl-based nonionic surfactant include a (meth)acrylic polymer having a weight average molecular weight of 1,000 to 1,000,000.

Addition of the surfactant having the polymerizable functional group to the polymerizable liquid crystal composition results in improving surface hardness of the liquid crystal polymer.

The polymerizable liquid crystal composition of the invention may contain the non-liquid crystal polymerizable compound. In order to maintain the liquid crystal phase, the total weight of the non-liquid crystal polymerizable compound in the polymerizable liquid crystal composition is preferably one tenth or less of the total weight of the polymerizable compound in the polymerizable liquid crystal composition.

Reinforcement of the mechanical strength of the liquid crystal polymer, or improvement of the chemical resistance or both thereof can be expected by addition of a compound having two or more polymerizable groups to the polymerizable liquid crystal composition.

Specific examples of the non-liquid crystal polymerizable compound include a compound having one or two or more vinyl-based polymerizable groups.

Improvement of adhesion between the polymerizable liquid crystal composition and the substrate can be expected by addition of the non-liquid crystal polymerizable compound having a polar group in a side chain and/or a terminal to the polymerizable liquid crystal composition.

Specific examples of the non-liquid crystal polymerizable compound being the monofunctional compound include styrene, nucleus-substituted styrene, acrylonitrile, vinyl chloride, vinylidene chloride, vinylpyridine, N-vinyl pyrrolidone, vinylsulfonic acid, fatty acid vinyl, α, β-ethylenic unsaturated carboxylic acid, alkyl ester of (meth)acrylic acid in which the number of carbon atoms is 1 to 18, hydroxy alkyl ester of (meth)acrylic acid in which the number of carbon atoms of hydroxyalkyl is 1 to 18, amino alkyl ester of (meth)acrylic acid in which the number of carbon atoms of amino alkyl is 1 to 18, ether oxygen-containing alkyl ester of (meth)acrylic acid in which the number of carbon atoms of ether oxygen-containing alkyl is 3 to 18, N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxyl ethyl (meth)acrylate, isobornyloxyl ethyl (meth)acrylate, isobornyl (meth)acrylate, adamantyl (meth)acrylate, dimethyladamantyl (meth)acrylate, dicyclopentanyl (meth)acrylate, dicyclopentenyl (meth)acrylate, 2-acryloyloxy ethyl succinate, 2-acryloyloxyethyl hexahydrophthalic acid, 2-acryloyloxyethyl phthalic acid, 2-acryloyloxyethyl-2-hydroxyethyl phthalic acid, 2-acryloyloxyethyl acid phosphate, 2-methacryloyloxyethyl acid phosphate, polyethylene glycol having a polymerization degree of 2 to 100, polypropylene glycol, mono(meth)acrylate or di(meth)acrylate of polyethylene glycol such as a copolymer between ethylene oxide and propylene oxide, or polyethylene glycol having a polymerization degree of 2 to 100 and capped with alkyl having 1 to 6 carbons at a terminal, and mono(meth)acrylate of polyalkylene glycol being a copolymer among polypropylene glycol, ethylene oxide and propylene oxide. Specific examples of "fatty acid vinyl" herein include vinyl acetate. Specific examples of "α,β-ethylenic unsaturated carboxylic acid" herein include acrylic acid, methacrylic acid, maleic acid, fumaric acid and itaconic acid. Specific examples of "ether oxygen-containing alkyl ester of (meth)acrylic acid in which the number of carbon atoms of ether oxygen-containing alkyl is 3 to 18" include methoxyethyl ester, ethoxyethyl ester, methoxypropyl ester, methylcarbyl ester, ethylcarbyl ester and butylcarbyl ester.

Specific examples of the non-liquid crystal polymerizable compound being the bifunctional compound include 1,4-butanediol diacrylate, 1,6-hexanediol diacrylate, 1,9-nonanediol diacrylate, neopentyl glycol diacrylate, dimethylol tricyclodecane diacrylate, triethylene glycol diacrylate, dipropylene glycol diacrylate, tripropylene glycol diacrylate, tetraethylene glycol diacrylate, bisphenol A EO-added diacrylate, bisphenol A glycidyl diacrylate, polyethylene glycol diacrylate and a methacrylate compound thereof.

Specific examples of the non-liquid crystal polymerizable compound of the polyfunctional compound being not the bifunctional compound include pentaerythritol triacrylate, trimethylolpropane triacrylate, trimethylol EO-added triacrylate, trisacryloyloxyethyl phosphate, tris(acryloyloxyethyl)isocyanurate, alkyl-modified dipentaerythritol triacrylate, EO-modified trimethylolpropane tricrylate, PO-modified trimethylolpropane triacrylate, pentaerythritol tetraacrylate, alkyl-modified dipentaerythritol tetraacrylate, ditrimethylolpropane tetraacrylate, dipentaerythritol hexaacrylate, dipentaerythritolmonohydroxy pentaacrylate, alkyl-modified dipentaerythritol pentaacrylate, pentaerythritol trimetaacrylate, trimethylolpropane trimethacrylate, trimethylol EO-added trimetaacrylate, trismethacryloyloxy ethyl phosphate, trismethacryloyloxy ethyl isocyanurate, alkyl-modified dipentaerythritol trimetaacrylate, EO-modified trimethylolpropane trimethacrylate, PO-modified trimethylolpropane trimethacrylate, pentaerythritol tetramethacrylate, alkyl-modified dipentaerythritol tetramethacrylate, ditrimethylolpropane tetramethacrylate, dipentaerythritol hexamethacrylate, dipentaerythritolmonohydroxy pentamethacrylate and alkyl-modified dipentaerythritol pentamethacrylate. Addition of a polymerizable compound having a bisphenol structure or cardo structure to the polymerizable liquid crystal composition results in inducing improvement of hardness of the polymer and homeotropic alignment of the liquid crystal polymer.

Specific examples of a polymerizable fluorene derivative having the cardo structure include compounds (α-1) to (α-3).

Formula 16

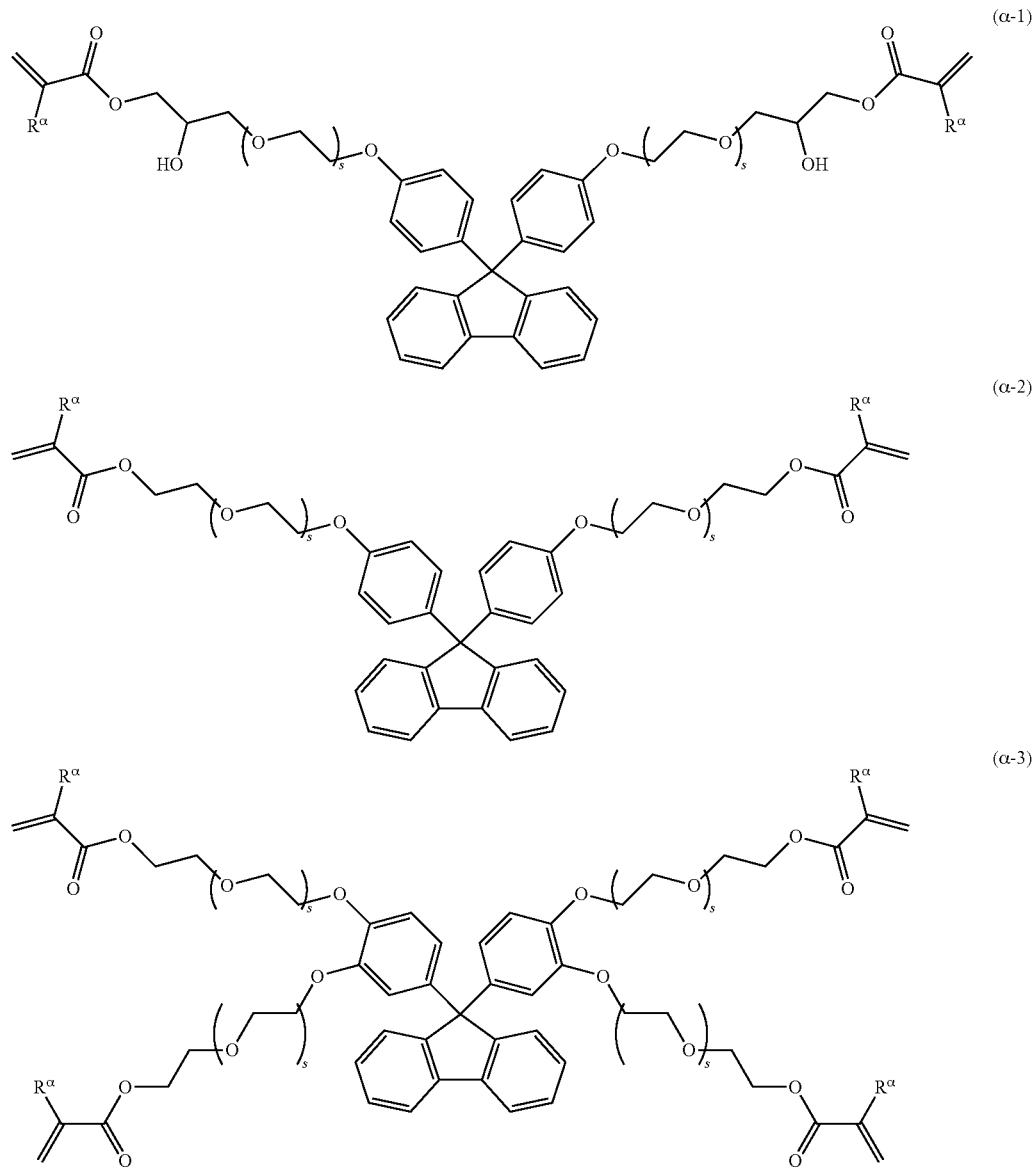

In formula (α-1) to (α-3), $R^\alpha$ is independently hydrogen or methyl, and s is independently an integer from 0 to 4.

Addition of a polymerization initiator results in optimizing a rate of polymerization of the polymerizable liquid crystal composition. Specific examples of the polymerization initiator include a photoradical initiator.

Specific examples of the photoradical initiator include 1-hydroxy-cyclohexyl-phenyl-ketone, 2-hydroxy-2-methyl-1-phenylpropane-1-one, 1-hydroxycyclohexylphenyl ketone, 2,2-dimethoxy-1,2-diphenylethane-1-one, p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a 2,4-diethylxanthone-methyl p-dimethylaminobenzoate mixture, a benzophenone-methyltriethanolamine mixture, Adeka Optomer N-1919, Adeka Cruise NCI-831, Adeka Cruise NCI-930, Irgacure 127, Irgacure 369, Irgacure 379, Irgacure 500, Irgacure 754, Irgacure 784, Irgacure 819, Irgacure 907, Irgacure 1300, Irgacure 1700, Irgacure 1800, Irgacure 1850, Irgacure 1870, Irgacure 2959, Irgacure OXE01, Irgacure OXE02, Darocur 4265, Darocur MBF and Darocur TPO. Here, Adeka, Irgacure and Darocur are registered trademarks.

The total weight of a photoradical polymerization initiator in the polymerizable liquid crystal composition is preferably 0.01 to 10% by weight, further preferably 0.1 to 4% by weight, and still further preferably 0.5 to 4% by weight, based on the total amount of the polymerizable liquid crystal composition.

A sensitizer may be added to the polymerizable liquid crystal composition together with the photoradical polymerization initiator. Specific examples of the sensitizer include isopropylthioxanthone, diethylthioxanthone, ethyl-4-dimethylaminobenzoate and 2-ethylhexyl-4-dimethylaminobenzoate.

A rate of reaction of the polymerizable liquid crystal compound and a length of a chain of the polymer in the liquid crystal polymerization film can be adjusted by addition of a chain transfer agent to the polymerizable liquid crystal composition.

The rate of reaction of the polymerizable liquid crystal compound is reduced by increase in an amount of the chain transfer agent. The length of the chain of the polymer is decreased by increase in the amount of the chain transfer agent.

Specific examples of the chain transfer agent include a thiol derivative and a styrene dimer derivative.

Specific examples of the thiol derivative include a thiol derivative being a monofunctional compound and a thiol derivative being a polyfunctional compound.

Specific examples of the thiol derivative being the monofunctional compound include dodecanethiol and 2-ethylhexyl-(3-mercapto) propionate. Specific examples of the thiol derivative being the polyfunctional compound include trimethylolpropane tris(3-mercaptopropionate), pentaerythritol tetrakis(3-mercaptopropionate), 1,4-bis(3-mercaptobutyryloxy) butane, pentaerythritol tetrakis(3-mercaptobutyrate) and 1,3,5-tris(3-mercaptobutyloxyethyl)-1,3,5-triazine-2,4,6(1H,3H,5H)-trione.

Specific examples of the styrene dimer-based chain transfer agent include 2,4-diphenyl-4-methyl-1-pentene and 2,4-diphenyl-1-butene.

Addition of a polymerization preventive to the polymerizable liquid crystal composition results in preventing start of polymerization during storage of the polymerizable liquid crystal composition. Specific examples of the polymerization preventive include (1) 2,5-di(t-butyl) hydroxytoluene, hydroquinone, methylene blue, diphenyl picryl hydrazide, phenothiazine and N,N-dimethyl-4-nitrosoaniline, each being a compound having a nitroso group, and (2) o-hydroxybenzophenone, 2H-1,3-benzothiazine-2,4-(3H)dione, each being a benzothiazine derivative.

Addition of a polymerization inhibitor to the polymerizable liquid crystal composition results in suppressing the polymerization reaction in the polymerizable liquid crystal composition by generation of radicals in the polymerizable liquid crystal composition. Addition of the polymerization inhibitor results in improving storage stability of the polymerizable liquid crystal composition.

Specific examples of the polymerization inhibitor include (1) a phenol-based antioxidant, (2) a sulfur-based antioxidant, (3) a phosphoric acid-based antioxidant and (4) an amine-based antioxidant. From a viewpoint of compatibility with the polymerizable liquid crystal composition or transparency of the liquid crystal polymer, a phenol-based antioxidant is preferred. From a viewpoint of the compatibility, as the phenol-based antioxidant, a compound having a t-butyl group in an ortho position of a hydroxy group is preferred.

Addition of an ultraviolet light absorber to the polymerizable liquid crystal composition results in improving weather resistance of the polymerizable liquid crystal composition.

Addition of alight stabilizer to the polymerizable liquid crystal composition results in improving the weather resistance of the polymerizable liquid crystal composition.

Addition of the antioxidant to the polymerizable liquid crystal composition results in improving the weather resistance of the polymerizable liquid crystal composition.

Addition of a silane coupling agent to the polymerizable liquid crystal composition results in improving adhesion between the substrate and the liquid crystal polymerization film.

In order to facilitate coating, a solvent is preferably added to the polymerizable liquid crystal composition.

Specific examples of a component of the solvent include ester, an amide-based compound, alcohol, ether, glycol monoalkyl ether, aromatic hydrocarbon, halogenated aromatic hydrocarbon, aliphatic hydrocarbon, halogenated aliphatic hydrocarbon, alicyclic hydrocarbon, ketone and an acetate-based solvent.

The amide-based compound means a compound having an amide group, and serving as the component of the solvent. The acetate-based solvent means a compound having an acetate structure, and serving as the component of the solvent.

Specific examples of the ester include alkyl acetate, ethyl trifluoroacetate, alkyl propionate, alkyl butyrate, dialkyl malonate, alkyl glycolate, alkyl lactate, monoacetin, γ-butyrolactone and γ-valerolactone.

Specific examples of "alkyl acetate" herein include methyl acetate, ethyl acetate, propyl acetate, isopropyl acetate, butyl acetate, 3-methoxybutyl acetate, isobutyl acetate, pentyl acetate and isopentyl acetate. Specific examples of "alkyl propionate" herein include methyl propionate, methyl 3-methoxypropionate, ethyl propionate, propyl propionate and butyl propionate. Specific examples of "alkyl butyrate" herein include methyl butyrate, ethyl butylate, butyl butyrate, isobutyl butyrate and propyl butyrate. Specific examples of "dialkyl malonate" herein include diethyl malonate. Specific examples of "alkyl glycolate" herein include methyl glycolate and ethyl glycolate. Specific examples of "alkyl lactate" herein include methyl lactate, ethyl lactate, isopropyl lactate, n-propyl lactate, butyl lactate and ethylhexyl lactate.

Specific examples of the amide-based compound include N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Specific examples of the alcohol include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methyl cyclohexanol.

Specific examples of the ether preferably include ethylene glycol dimethyl ether, diethylene glycol dimethyl ether, bis(2-propyl)ether, 1,4-dioxane and THF.

Specific examples of the glycol monoalkyl ether include ethylene glycol monoalkyl ether, diethylene glycol monoalkyl ether, triethylene glycol monoalkyl ether, propylene glycol monoalkyl ether, dipropylene glycol monoalkyl ether, ethylene glycol monoalkyl ether acetate, diethylene glycol monoalkyl ether acetate, triethylene glycol monoalkyl ether acetate, propylene glycol monoalkyl ether acetate, dipropylene glycol monoalkyl ether acetate and diethylene glycol methyl ethyl ether.

Specific examples of "ethylene glycol monoalkyl ether" herein include ethylene glycol monomethyl ether and ethylene glycol monobutyl ether. Specific examples of "diethylene glycol monoalkyl ether" herein include diethylene glycol monoethyl ether. Specific examples of "propylene glycol monoalkyl ether" herein include propylene glycol monobutyl ether. Specific examples of "dipropylene glycol monoalkyl ether" herein include dipropylene glycol monomethyl ether. Specific examples of "ethylene glycol monoalkyl ether acetate" herein include ethylene glycol monobutyl ether acetate. Specific examples of "diethylene glycol monoalkyl ether acetate" herein include diethylene glycol monoethyl ether acetate. Specific examples of "propylene glycol monoalkyl ether acetate" herein include propylene glycol monomethyl ether acetate, propylene glycol monoethyl ether acetate and propylene glycol monobutyl ether acetate. Specific examples of "dipropylene glycol monoalkyl ether acetate" herein include dipropylene glycol monomethyl ether acetate.

Specific examples of the aromatic hydrocarbon include benzene, toluene, xylene, mesitylene, ethylbenzene, diethylbenzene, i-propylbenzene, n-propylbenzene, t-butylbenzene, s-butylbenzene, n-butylbenzene and tetralin.

Specific examples of the halogenated aromatic hydrocarbon include chlorobenzene. Specific examples of the aliphatic hydrocarbon include hexane and heptane. Specific examples of the halogenated aliphatic hydrocarbon include chloroform, dichloromethane, carbon tetrachloride, dichloroethane, trichloroethylene and tetrachloroethylene. Specific examples of the alicyclic hydrocarbon include cyclohexane and decalin.

Specific examples of the ketone include acetone, methyl ethyl ketone, methyl isobutyl ketone, cyclohexanone, cyclopentanone and methyl propyl ketone.

Specific examples of the acetate-based solvent include ethylene glycol monomethyl ether acetate, propylene glycol monomethyl ether acetate, propylene glycol monoethyl ether acetate, methyl acetoacetate and 1-methoxy-2-propyl acetate.

From a viewpoint of the compatibility with the polymerizable liquid crystal compound, an amount of the solvent in the polymerizable liquid crystal composition is preferably 30 to 96% by weight, further preferably 50 to 90% by weight, and still further preferably 60 to 80% by weight, based on the total amount of the polymerizable liquid crystal composition.

The polymerizable liquid crystal composition of the invention may contain a compound having optical activity. Addition of the compound having optical activity to the liquid crystal composition results in inducing the liquid crystal polymerization film into twist alignment. The liquid crystal polymer can be used as a selective reflection film and a negative C-plate in a wavelength region of 300 to 2,000 nanometers.

Specific examples of the compound having optical activity include a compound having asymmetric carbon, an axial chirality compound having a binaphthyl structure and a helicene structure, and a planar chirality compound having a cyclophane structure. From a viewpoint of immobilizing a helical pitch of twist alignment, the compound having optical activity in the above case is preferably a polymerizable compound.

The liquid crystal polymer of the invention may contain a dichroic dye. The liquid crystal polymer forming a composite with the dichroic dye can be used in the form of an absorptive polarizing plate.

The dichroic dye preferably has a maximum absorption wavelength in the range of 300 to 700 nanometers. As the dichroic dye, an acridine dye, an oxazine dye, a cyanine dye, a naphthalene dye, an azo dye, an anthraquinone pigment or the like can be utilized. Specific examples of the azo dye include a monoazo dye, a bisazo dye, a trisazo dye, a tetrakisazo dye and a stilbeneazo dye.

The liquid crystal polymer of the invention may contain a fluorescent dye. The liquid crystal polymer forming a composite with the fluorescent dye can be used in the form of a polarizing light-emitting film and a wavelength conversion film.

Substrate

Specific examples of material of the substrate include glass, plastic and metal. The glass or the metal may be subjected to slit-form processing on a surface thereof. The plastic may be subjected to stretching treatment and surface treatment such as hydrophilizing treatment and hydrophobicizing treatment.

When the liquid crystal polymer having homogeneous alignment and tilt alignment is formed on the substrate, surface treatment is applied to the substrate before the polymerizable liquid crystal composition is applied to the substrate to induce alignment of the liquid crystal polymer. Specific examples of the surface treatment include (a) a method of applying rubbing onto a substrate, (d) a method of applying inclined deposition of silicon oxide onto a substrate and (c) a method of arranging a polymer coat onto a substrate and irradiating the polymer coat with polarized ultraviolet light.

The following procedure is one example of the rubbing:
(1) rubbing cloth formed of a raw material such as rayon, cotton and polyamide is wound around a metallic roll or the like;
(2) the roll is brought into contact with the substrate; and
(3) the roll is moved in parallel to a surface of the substrate while the roll is rotated, or the substrate is moved with keeping immobilization of the roll.

A coat of the polymer may be arranged on the substrate before rubbing to apply rubbing onto the coat. As the coat, a material called a rubbing alignment film of polyimide, polyamic acid, polyvinyl alcohol or the like is used.

Defects of alignment of the liquid crystal polymer, or the like can be prevented by the rubbing.

The following procedure is one example of the irradiation with polarized ultraviolet light:
(1) a polymer coat called a photoalignment film is arranged on a substrate;
(2) the substrate is irradiated with linear polarization having a wavelength of 250 to 400 nanometers; and
(3) when necessary, heat treatment is applied thereto.

The photoalignment film is a film of polyimide, polyamic acid or polyacrylate containing a photosensitive group, or the like. The photosensitive group is preferably a chalcone group, cinnamoyl or an azo group.

The defects of alignment of the liquid crystal polymer, or the like can be prevented by irradiation with polarized ultraviolet light, and the defects of alignment by scraping or the like by the rubbing can also be prevented thereby.

Liquid Crystal Polymer

A liquid crystal polymer with a substrate of the invention is obtained by the following steps:
(1) a polymerizable liquid crystal composition is applied onto a substrate, and when necessary, the resulting material is dried to form a coating film; and
(2) the polymerizable liquid crystal composition is polymerized by means of light, heat, a catalyst or the like in a state in which the polymerizable liquid crystal composition is aligned to obtain a liquid crystal polymer with a substrate.

Thus, the polymerizable liquid crystal composition in the coating film is immobilized with keeping a liquid crystalline state.

Various coating methods are used for coating the substrate with the polymerizable liquid crystal composition. From a viewpoint of uniformity of a film thickness of the polymerizable liquid crystal composition on the substrate, as a coating method, a spin coating method, a microgravure coating method, a gravure coating method, a wire-bar coating method, a dip coating method, a spray coating method, a meniscus coating method and a die coating method are preferred.

Heat treatment during drying upon forming the liquid crystal polymer with the substrate is preferably applied thereto for removing the solvent. The heat treatment can be applied thereto by using a hot plate or a drying oven, or by blowing warm air or hot air, or the like.

A means such as an electron beam, ultraviolet light, visible light and infrared light can be utilized for obtaining the liquid crystal polymer of the invention. A range of a wavelength of irradiation light for obtaining the liquid crystal polymer is 150 to 500 nanometers. A range of a wavelength of light is preferably 250 to 450 nanometers, and further preferably 300 to 400 nanometers.

As a light source of the light, a low-pressure mercury lamp, a high-pressure discharge lamp and a short arc discharge lamp can be utilized. Specific examples of the low-pressure mercury lamp include a bactericidal lamp, a fluorescent chemical lamp and a black light. Specific examples of the high-pressure discharge lamp include a high pressure mercury lamp and a metal halide lamp. Specific examples of the short arc discharge lamp include an ultra-high pressure mercury lamp, a Xenon lamp and a Mercury-Xenon lamp.

The liquid crystal polymer can be arranged inside and outside a liquid crystal cell of a liquid crystal display device. The liquid crystal polymer can be arranged inside the liquid crystal cell because of small variation of retardation Re of the liquid crystal polymer by a heat history and small elution of impurities from the liquid crystal polymer to liquid crystals.

A polarizing plate having a function of optical compensation or the like can be produced by applying the polarizing plate as the substrate and forming the liquid crystal polymer. For example, a circularly polarizing plate can be produced by combining the liquid crystal polymer having retardation of a ¼ wavelength plate with the polarizing plate.

Specific examples of the polarizing plate include an absorptive polarizing plate in which iodine or a dichroic dye is doped and a reflective polarizing plate such as a wire grid polarizing plate.

As a method of eliminating the liquid crystal polymerization film from the liquid crystal polymer with the substrate and fixing the film to another substrate, the following method is known:

(1) a liquid crystal polymer with a substrate is laminated with a substrate having an adhesive layer in such a manner that the liquid crystal polymerization film is brought into contact with the adhesive layer;

(2) the material laminated in such a manner that the liquid crystal polymerization film is brought into contact with the adhesive layer is peeled off in a place between a substrate portion of the liquid crystal polymer with the substrate, and the liquid crystal polymerization film; and (3) the liquid crystal polymerization film on the substrate having the adhesive layer is fixed to another substrate in a manner similar to the steps (1) and (2) described above.

EXAMPLES

The invention is not limited only to Examples described to the public.

In Examples of the invention, "DCC" means 1,3-dicyclohexylcarbodiimide.

In Examples of the invention, "DMAP" means 4-dimethylaminopyridine.

In Examples of the invention, "Irg-907" means IRGACURE (trademark) 907 (Irg-907) made by BASF Japan Ltd.

In Examples of the invention, "NCI-930" means ADEKARKLS (trademark) NCI-930 made by ADEKA Corporation.

In Examples of the invention, "FTX-218" means FUTARGENT (trademark) FTX-218 made by Neos Co., Ltd.

In Examples of the invention, "TEGOFlow 370" means TEGOFLOW (trademark) 370 of Evonik Japan, Inc.

In Examples of the invention, "palladium on carbon" means P1528 made by Tokyo Chemical Industry Co., Ltd.

Polymerization Conditions

A polymerizable liquid crystal composition was irradiated with light from an ultra-high pressure mercury lamp for 30 seconds at room temperature under a nitrogen atmosphere to polymerize the composition. The composition was irradiated with the light from the ultra-high pressure mercury lamp to be 30 mW/cm$^2$ in irradiance of ultraviolet light having a wavelength of 365 nm on a surface of the polymerizable liquid crystal composition. As the ultra-high pressure mercury lamp, Multilight USH-250BY made by Ushio Inc. was used. The irradiance was measured by using Ultraviolet Intensity Meter UIT-150-A and Photodetector UVD-S365 made by Ushio Inc. according to a user instruction.

Confirmation of Structure of Compound

A structure of a compound was confirmed by measuring proton NMR at 500 MHz by using DRX-500 made by Bruker Corporation. A unit of a numeric value as described below was ppm. Then, s, d, t and m stand for a singlet, a doublet a triplet and a multiplet, respectively.

Phase Transition Temperature

A sample was placed on a hot plate in a melting point apparatus, and a transition temperature was measured with a polarizing microscope. The transition temperature was measured while a temperature of the sample was raised at a rate of 3° C. per minute.

Visual Observation Method

A substrate on which a phase difference film was formed was interposed between two polarizing plates arranged in a crossed Nicol state, and the resulting set was observed. The substrate was rotated in a horizontal plane to confirm a bright and dark state. The substrate on which the phase difference film was formed was observed by a polarizing microscope to confirm existence or non-existence of alignment defects. A case where a place through which light was observed was observed in a dark state or neither a light state nor a dark state was unable to be confirmed was deemed as "defective alignment." A case other than "defective alignment" was deemed "non-defective alignment."

Measurement of Film Thickness

A film thickness of the liquid crystal polymerization film was measured according to the following procedures:

(1) a liquid crystal polymerization film was shaved off from a glass substrate with a liquid crystal film;

(2) a level difference between a portion having the liquid crystal polymerization film and a portion having no liquid crystal polymerization film was measured; and (3) the resulting measured value was taken as a film thickness.

The level difference between the portions of the liquid crystal polymer was measured by using Alpha-Step IQ made by KLA-Tencor Corporation.

Measurement by Ellipsometer

Retardation Re was measured by using OPTIPRO Ellipsometer made by Shintech, Inc. Retardation Re was measured while an angle of incident light to a surface of the liquid crystal polymer was decreased from 90°. Wavelengths of light used for measurement were 450 nm, 550 nm and 650 nm.

Evaluation of Birefringence Δn

Birefringence Δn for every wavelength was calculated by "(retardation Re)/(film thickness)."

Measurement of Luminance in Crossed Nicol State and Luminance in Parallel Nicol State Luminance in a crossed Nicol state and luminance in a parallel Nicol state were evaluated by using a luminance meter by interposing, between two polarizing plates of a polarizing microscope, a substrate on which a phase difference film was formed. As the luminance meter, YOKOGAWA 3298F. was used. Luminance to be a minimum when the substrate was horizontally rotated was regarded as "luminance in the crossed Nicol state." Luminance to be a maximum when the substrate was rotated in a horizontal plane was regarded as "luminance in the parallel Nicol state."

Preparation of Photo-Alignment Agent

A polymer represented by formula (J) was synthesized in a manner similar to the method in Example 9 in JP 2012-087286 A.

Formula 17

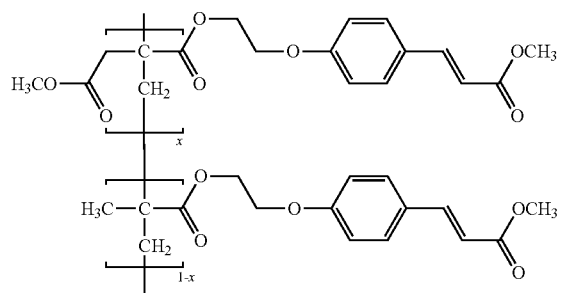

(J)

In formula (J), x was 0.1, and a weight average molecular weight was 53,700. Then, 5% by weight of the polymer represented by formula (J) was dissolved into 95% by weight of cyclopentanone, and a material obtained by filtrating the resulting mixture with a filter was named as photo-alignment agent (1). Here, the weight average molecular weight was determined by a gel permeation chromatograph. LC-9A Gel Permeation Chromatograph made by Shimadzu Corporation was used as the gel permeation chromatograph. Shodex GF-7M HQ was used as a column of the gel permeation chromatograph. Shodex is a registered trademark of Showa Denko K.K.

A temperature of the column during the development was set to 40° C. THF was used as an eluent in GPC. On the above occasion, polystyrene having a known molecular weight was used as a reference material for determining the weight average molecular weight. As the filter, 13JP020AN made by Advantech Co., Ltd. was used. A pore size described on the filter was 0.2 μm.

Adjustment of Photoalignment Film

A glass substrate with an alignment film subjected to polarized ultraviolet light treatment was prepared according to the following steps:

(1) photo-alignment agent (1) was spin-coated onto glass to prepare a coating film;

(2) a substrate having the coating film was left to stand on a hot plate at 100° C. for 60 seconds to remove a solvent from the coating film; and (3) the coating film was irradiated with linearly polarized ultraviolet light having a wavelength in the vicinity of 313 nm at 200 mJ/cm$^2$ from a direction at 90° relative to a coated surface. The linearly polarized ultraviolet light was obtained by transmitting light from an ultra-high pressure mercury lamp to a wire grid polarizing plate. Multilight USH-250BY made by Ushio Inc. was used as the ultra-high pressure mercury lamp. The wire grid polarizing plate was UVT300A made by Polatechno Co., Ltd.

Example 1

Compound (1-1-1-1) was prepared according to the procedures described below.

Formula 18

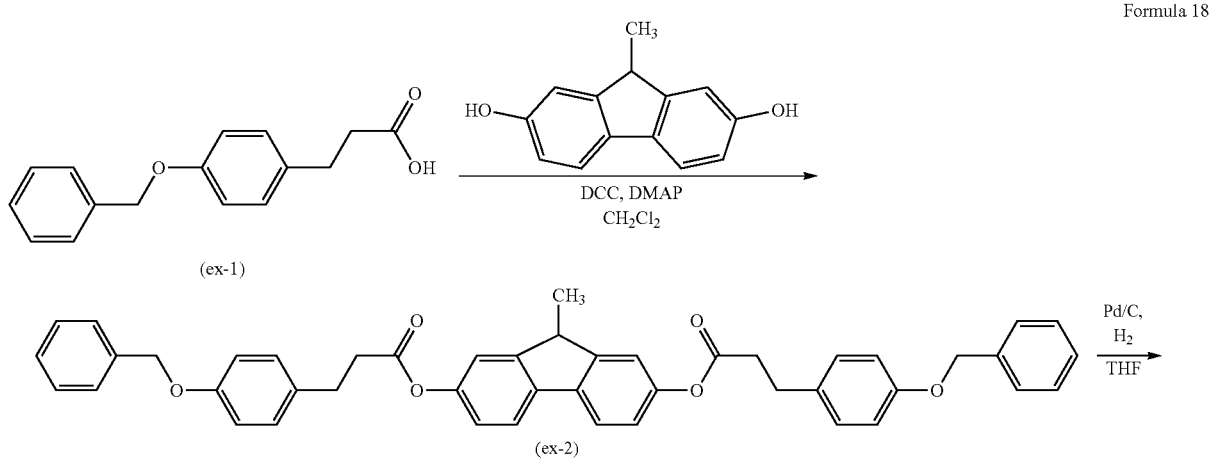

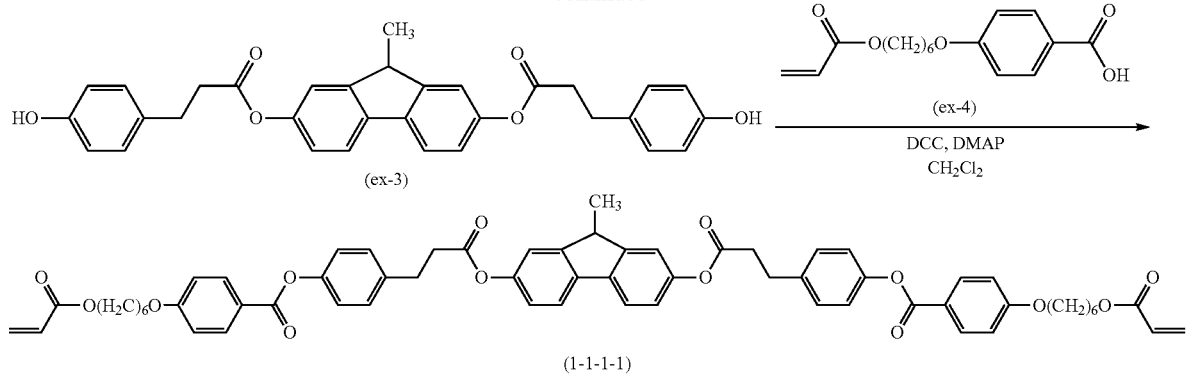

Compound ex-1 was synthesized in a manner similar to the method described in ACS Medicinal Chemistry Letters, 2010, 1(7), pp 345-349.

To 50 mL of dichloromethane, 5.0 g of compound ex-1, 2.0 g of 2,7-dihydroxy-9-methylfluorene and 0.5 g of DMAP were added, and the resulting mixture was stirred under a nitrogen atmosphere while the resulting mixture was cooled. Then, 10 mL of a dichloromethane solution in which 4.2 g of DCC was dissolved was added dropwise thereto. After dropwise addition, the resulting mixture was stirred at room temperature for 16 hours. A deposit precipitate was filtered off, and an organic layer was washed with water and dried over anhydrous magnesium sulfate. Dichloromethane was distilled off under reduced pressure, and the residue was purified by column chromatography and recrystallized in methanol to obtain 5.6 g of compound (ex-2). Here, a packing material in column chromatography was silica gel. Here, an eluent was a toluene-ethyl acetate mixture (v/v=14/1).

To 56 mL of THF, 5.6 g of compound ex-2 and 0.3 g of palladium on carbon were added, and the resulting mixture was stirred at room temperature under a hydrogen atmosphere for 24 hours. An insoluble matter was filtered off, and THF was distilled off under reduced pressure and the resulting material was dried under reduced pressure to obtain 3.8 g of compound (ex-3).

Compound ex-4 was synthesized in a manner similar to the method described in Journal of Polymer Science, Part A; Polymer Chemistry, 2011, 49(3), pp 770-780.

To 40 mL of dichloromethane, 3.8 g of compound ex-3, 4.5 g of compound ex-4 and 0.4 g of DMAP were added, and the resulting mixture was stirred under a nitrogen atmosphere while the resulting mixture was cooled. Then, 7 mL of a dichloromethane solution in which 3.3 g of DCC was dissolved was added dropwise thereto. After dropwise addition, the resulting mixture was stirred at room temperature for 16 hours. A deposit precipitated was filtered off, and an organic layer was washed with water and dried over anhydrous magnesium sulfate. Dichloromethane was distilled off under reduced pressure, and the residue was purified by column chromatography and recrystallized in methanol to obtain 5.6 g of compound (1-1-1-1). Here, a packing material in column chromatography was silica gel. Here, an eluent was a toluene-ethyl acetate mixture (v/v=14/1).

A phase transition temperature and NMR analysis values of compound (1-1-1-1) were as described below.

A transition temperature from a crystal phase to a nematic phase in compound (1-1-1-1) was 111° C. A transition temperature from the nematic phase to an isotropic liquid in compound (1-1-1-1) was unable to be confirmed at 250° C. or lower.

$^1$H-NMR (CDCl$_3$; δ ppm): 8.15 (d, 4H), 7.67 (d, 2H), 7.34 (d, 4H), 7.17 (d, 6H), 7.01 (d, 2H), 6.97 (d, 4H), 6.41 (d, 2H), 6.16-6.08 (m, 2H), 5.83 (d, 2H), 4.18 (t, 4H), 4.05 (t, 4H), 3.96-3.90 (m, 1H), 3.12 (t, 4H), 2.93 (t, 4H), 1.88-1.81 (m, 4H), 1.77-1.70 (m, 4H), 1.58-1.44 (m, 11H).

Example 2

Compound (1-1-2-1) was synthesized according to the procedures described below.

Formula 18

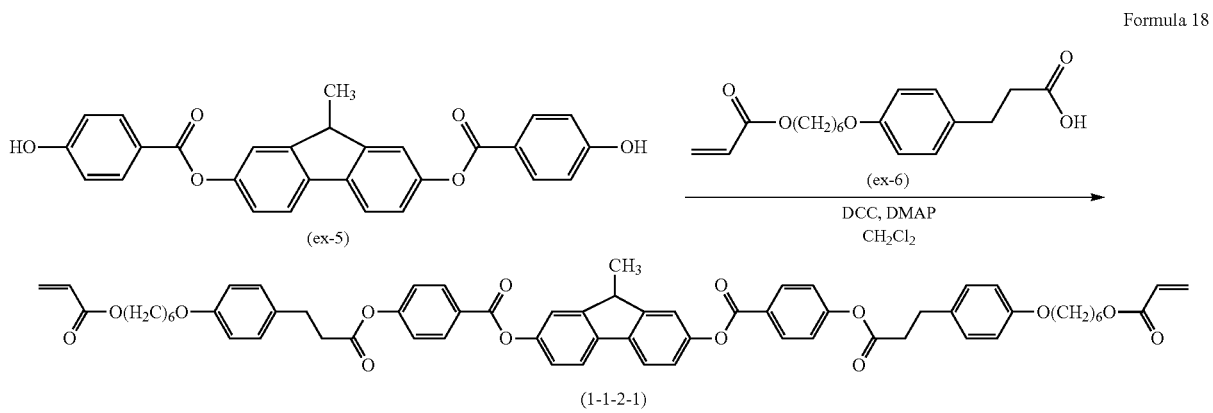

Compound ex-5 was synthesized in a manner similar to the method described in Example 1 in JP 5310548 B.

Compound ex-6 was synthesized in a manner similar to the method described in Example 5 in JP 2016-47813 A.

To 221 mL of dichloromethane, 15.2 g of compound ex-5, 22.1 g of compound ex-6 and 1.7 g of DMAP were added, and the resulting mixture was stirred under a nitrogen atmosphere while the resulting mixture was cooled. Then, 30 mL of a dichloromethane solution in which 14.9 g of DCC was dissolved was added dropwise thereto. After dropwise addition, the resulting mixture was stirred at room temperature for 16 hours. A deposit precipitated was filtered off, and an organic layer was washed with water and dried over anhydrous magnesium sulfate. Dichloromethane was distilled off under reduced pressure, and the residue was purified by column chromatography and recrystallized in methanol to obtain 16 g of compound (1-1-2-1). Here, a packing material in column chromatography was silica gel. Here, an eluent was a toluene-ethyl acetate mixture (v/v=20/1).

A phase transition temperature and NMR analysis values of compound (1-1-2-1) were as described below.

A transition temperature from a crystal phase to a nematic phase in compound (1-1-2-1) was 116° C. A transition temperature from the nematic phase to an isotropic liquid in compound (1-1-2-1) was unable to be confirmed at 250° C. or lower.

$^1$H-NMR (CDCl$_3$; δ ppm): 8.25 (d, 4H), 7.76 (d, 2H), 7.36 (s, 1H), 7.23-7.16 (m, 10H), 6.86 (d, 4H), 6.40 (d, 2H), 6.16-6.08 (m, 2H), 5.82 (d, 2H), 4.17 (t, 4H), 4.04-3.98 (m, 1H), 3.95 (t, 4H), 3.03 (t, 4H), 2.90 (t, 4H), 1.84-1.77 (m, 4H), 1.76-1.68 (m, 4H), 1.58-1.42 (m, 11H).

Example 3

Compound (1-1-1-2) was synthesized according to the procedures described below.

Compound ex-7 was synthesized in a manner similar to the method described in JP 2009-242540 A.

To 200 mL of dichloromethane, 18.8 g of compound ex-3, 20.0 g of compound ex-7 and 1.8 g of DMAP were added, and the resulting mixture was stirred under a nitrogen atmosphere while the resulting mixture was cooled. Then, 33 mL of a dichloromethane solution in which 16.4 g of DCC was dissolved was added dropwise thereto. After dropwise addition, the resulting mixture was stirred at room temperature for 16 hours. A deposit precipitated was filtered off, and an organic layer was washed with water and dried over anhydrous magnesium sulfate. Dichloromethane was distilled off under reduced pressure, and the residue was purified by column chromatography and recrystallized in methanol to obtain 30.8 g of compound (1-1-1-2). Here, a packing material in column chromatography was silica gel. Here, an eluent was a toluene-ethyl acetate mixture (v/v=9/1).

A phase transition temperature and NMR analysis values of compound (1-1-1-2) were as described below.

A transition temperature from a crystal phase to a nematic phase in compound (1-1-1-2) was 101° C. A transition temperature from the nematic phase to an isotropic liquid in compound (1-1-1-2) was unable to be confirmed at 250° C. or lower.

$^1$H-NMR (CDCl$_3$; δ ppm): 8.15 (d, 4H), 7.67 (d, 2H), 7.34 (d, 4H), 7.17 (d, 6H), 7.01 (d, 2H), 6.97 (d, 4H), 6.42 (d, 2H), 6.16-6.08 (m, 2H), 5.83 (d, 2H), 4.26 (t, 4H), 4.10 (t, 4H), 3.97-3.91 (m, 1H), 3.12 (t, 4H), 2.93 (t, 4H), 1.98-1.87 (m, 8H), 1.49 (d, 3H).

Example 4

Compound (1-1-5-1) was synthesized according to the procedures described below.

Formula 18

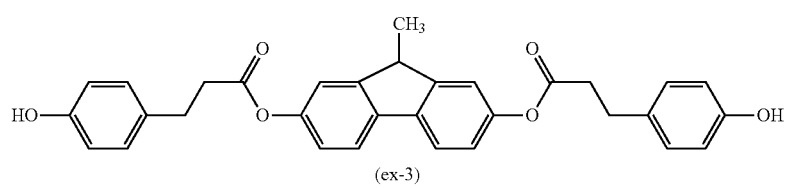 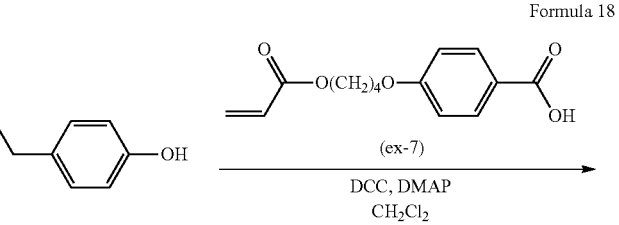

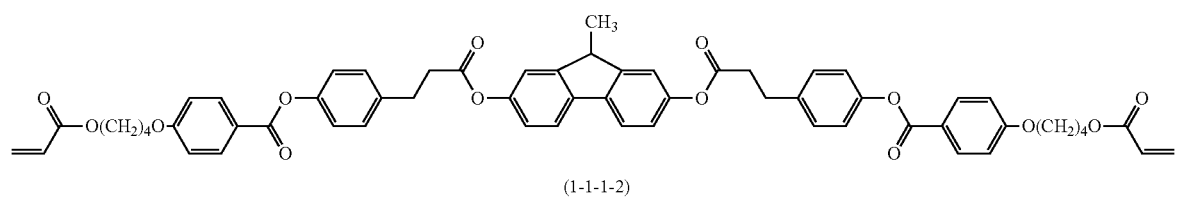

(1-1-1-2)

Formula 18

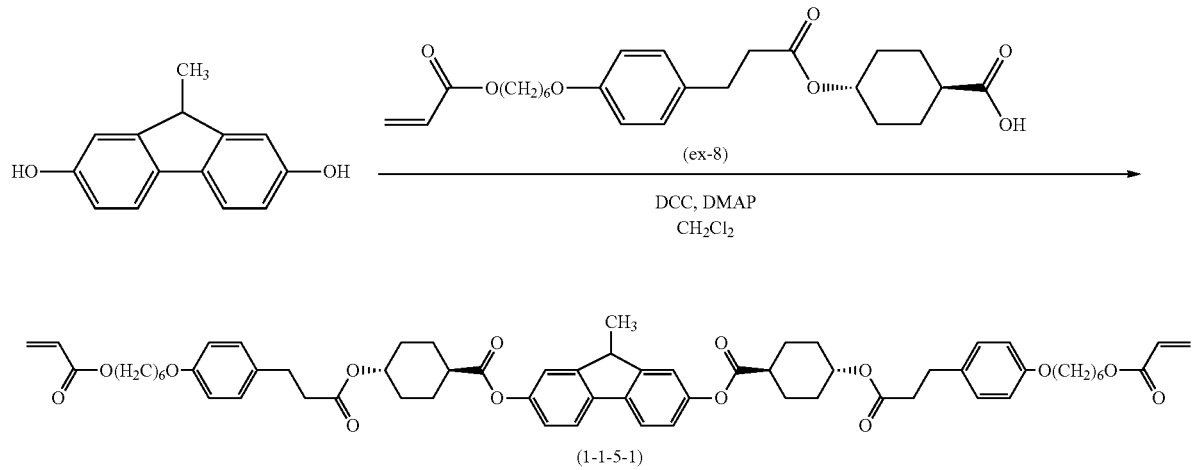

(1-1-5-1)

Compound ex-8 was synthesized in a manner similar to the method described in Example 5 in JP 2016-047813 A.

To 100 mL of dichloromethane, 2.3 g of 2,7-dihydroxy-9-methylfluorene, 10.0 g of compound ex-8 and 0.5 g of DMAP were added, and the resulting mixture was stirred under a nitrogen atmosphere while the resulting mixture was cooled. Then, 10 mL of a dichloromethane solution in which 4.9 g of DCC was dissolved was added dropwise thereto. After dropwise addition, the resulting mixture was stirred at room temperature for 16 hours. A deposit precipitated was filtered off, and an organic layer was washed with water and dried over anhydrous magnesium sulfate. Dichloromethane was distilled off under reduced pressure, and the residue was purified by column chromatography and recrystallized in methanol to obtain 8.2 g of compound (1-1-5-1). Here, a packing material in column chromatography was silica gel. Here, an eluent was a toluene-ethyl acetate mixture (v/v=9/1).

A phase transition temperature and NMR analysis values of compound (1-1-5-1) were as described below.

A transition temperature from a crystal phase to a nematic phase in compound (1-1-5-1) was 127° C. A transition temperature from the nematic phase to an isotropic liquid in compound (1-1-5-1) was unable to be confirmed at 250° C. or lower.

$^1$H-NMR (CDCl$_3$; δ ppm): 7.68 (d, 2H), 7.18 (d, 2H), 7.11 (d, 4H), 7.06 (d, 2H), 6.81 (d, 4H), 6.42 (d, 2H), 6.16-6.08 (m, 2H), 5.83 (d, 2H), 4.83-4.77 (m, 2H), 4.21-4.13 (m, 5H), 3.93 (t, 4H), 2.89 (t, 4H), 2.62-2.53 (m, 6H), 2.24-2.18 (m, 4H), 2.12-2.04 (m, 4H), 1.83-1.68 (m, 12H), 1.63-1.42 (m, 15H).

Preparation of Polymerizable Liquid Crystal Composition

Example 5

Structures of compounds (M-2-1-1) and (M-2-21-1) each being a component of the polymerizable liquid crystal composition are described below.

Formula 19

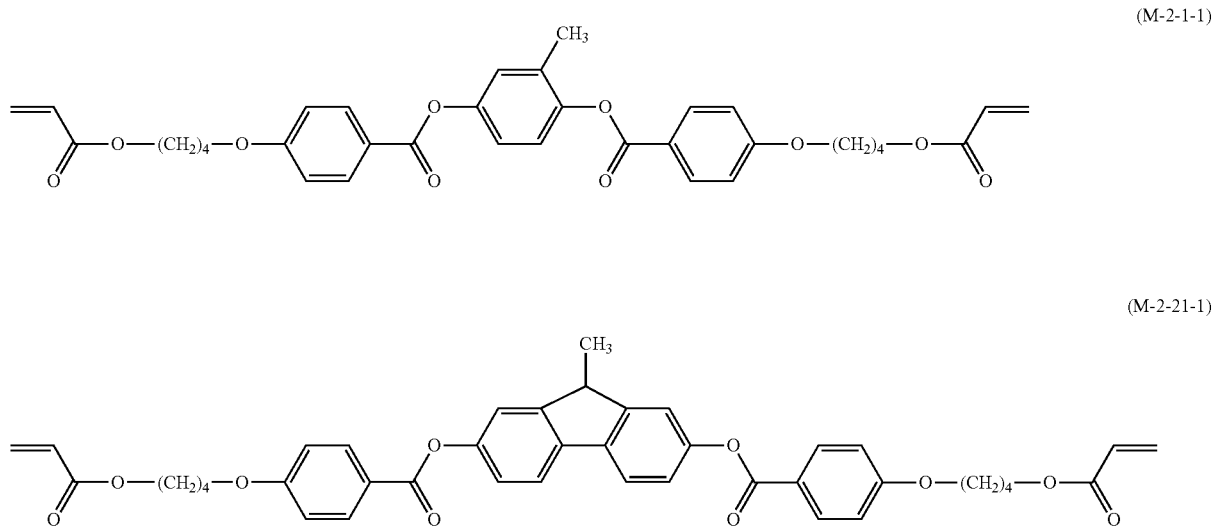

Table 1 and Table 2 show compounds and contents thereof in the polymerizable liquid crystal compositions confirmed in Examples of the invention. In addition, "-" in the Tables means no addition.

TABLE 1

| Name of polymerizable liquid crystal composition | Content and name of compound (1) | Content of compound (M-2-1-1) | Content of compound (M-2-21-1) | Content and name of polymerization initiator | Content and name of surfactant | Content of cyclohexanone used as solvent |
|---|---|---|---|---|---|---|
| S-1 | 3.4% by weight of compound (1-1-1-1) | 11.9% by weight | 1.7% by weight | 1.02% by weight of NCI-930 | 0.05% by weight of FTX-218 | 81.93% by weight |
| S-2 | 6.8% by weight of compound (1-1-1-1) | 8.5% by weight | 1.7% by weight | 1.02% by weight of Irg-907 | 0.05% by weight of TEGOFlow 370 | 81.93% by weight |
| S-3 | 3.6% by weight of compound (1-1-2-1) | 14.4% by weight | — | 1.08% by weight of Irg-907 | 0.05% by weight of TEGOFlow 370 | 80.87% by weight |
| S-4 | 6.8% by weight of compound (1-1-1-2) | 8.5% by weight | 1.7% by weight | 1.02% by weight of NCI-930 | 0.05% by weight of TEGOFlow 370 | 81.93% by weight |
| S-5 | 1.7% by weight of compound (1-1-5-1) | 13.6% by weight | 1.7% by weight | 1.02% by weight of NCI-930 | 0.05% by weight of TEGOFlow 370 | 81.93% by weight |

TABLE 2

| Name of polymerizable liquid crystal composition | Content of compound (M-2-1-1) | Content of compound (M-2-21-1) | Content and name of polymerization initiator | Content and name of surfactant | Content of cyclohexanone used as solvent |
|---|---|---|---|---|---|
| SC-1 | 15.3% by weight | 1.7% by weight | 1.02% by weight of Irg-907 | 0.05% by weight of FTX-218 | 81.93% by weight |
| SC-2 | 8.5% by weight | 8.5% by weight | 1.02% by weight of Irg-907 | 0.05% by weight of TEGOFlow 370 | 81.93% by weight |

Preparation of Liquid Crystal Polymer

Example 6

Liquid crystal polymer (F-1) was prepared according to the procedures described below:

(1) liquid crystal composition (S-1) was applied onto a glass substrate with an alignment film subjected to polarized ultraviolet light treatment by spin coating;

(2) the substrate was heated on a hot plate at 80° C. for 3 minutes;

(3) subsequently, the substrate was cooled at room temperature for 3 minutes; and (4) the substrate was polymerized by irradiation with ultraviolet light in air at room temperature.

Liquid crystal polymer (F-1) had homogeneous alignment. Liquid crystal polymer (F-1) was non-defective alignment.

Example 7

Liquid crystal polymers (F-2) to (F-5) were obtained by using liquid crystal compositions (S-2) to (S-5) in place of liquid crystal composition (S-1) according to the procedures described in Example 6. Liquid crystal polymers (F-2) to (F-5) had homogeneous alignment. Liquid crystal polymers (F-2) to (F-5) were non-defective alignment.

Comparative Example 2

Liquid crystal polymer (CF-1) was obtained by using liquid crystal composition (SC-1) in place of liquid crystal composition (S-1) according to the procedures described in Example 6. Liquid crystal polymer (CF-2) was obtained by using liquid crystal composition (SC-2) in place of liquid crystal composition (S-1) according to the procedures described in Example 6.

Optical Characteristics of Optically Anisotropic Film

TABLE 3

| Name of liquid crystal polymer | Name of polymerizable liquid crystal composition | Retardation Re | Birefringence $\Delta n$ | Front contrast |
|---|---|---|---|---|
| F-1 | S-1 | 136.3 | 0.18 | 5500 |
| F-2 | S-2 | 138.9 | 0.20 | 6100 |
| F-3 | S-3 | 140.3 | 0.18 | 5500 |
| F-4 | S-4 | 142.4 | 0.20 | 6100 |
| F-5 | S-5 | 139.1 | 0.17 | 5200 |
| CF-1 | SC-1 | 139.7 | 0.17 | 4900 |
| CF-2 | SC-2 | 141.0 | 0.20 | 4900 |

Table 3 describes retardation Re of light having a wavelength of 550 nm, birefringence Δn of light having a wavelength of 550 nm and front contrast for every liquid crystal polymer.

Table 3 shows that the front contrast in liquid crystal polymers (F-1) to (F-5) each is significantly higher than the front contrast in liquid crystal polymers (CF-1) and (CF-2).

Thus, the liquid crystal polymer having high front contrast can be obviously obtained from the polymerizable liquid crystal composition containing the polymerizable liquid crystal compound of the invention.

What is claimed is:

1. A polymerizable liquid crystal compound, represented by formula (1):

Formula 1

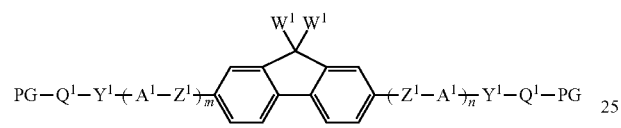
(1)

wherein, in formula (1),
- $W^1$ is independently hydrogen, fluorine, alkyl having 1 to 5 carbons, alkenyl having 2 to 5 carbons or fluoroalkyl having 1 to 5 carbons,
- $A^1$ is independently 1,4-phenylene, 1,4-cyclohexylene or naphthalene-2,6-diyl, and in the rings, at least one hydrogen may be replaced by fluorine, chlorine, trifluoromethyl, alkyl having 1 to 5 carbons, alkoxy having 1 to 5 carbons, alkoxycarbonyl having 1 to 5 carbons or alkanoyl having 1 to 5 carbons,
- $Z^1$ is independently —CH$_2$CH$_2$—, —COO—, —OCO—, —CH$_2$O—, —OCH$_2$—, —OCH$_2$CH$_2$O—, —CH=CHCOO—, —OCOCH=CH—, —CH$_2$CH$_2$COO—, —OCOCH$_2$CH$_2$—, —CH$_2$CH$_2$OCO— or —COOCH$_2$CH$_2$—,
- m and n are independently an integer from 0 to 7, with the provisio that m+n is greater than or equal to 3 and less than or equal to 8,
- $Y^1$ is independently a single bond, —O—, —COO—, —OCO— or —OCOO—,
- $Q^1$ is independently an single bond or alkylene having 1 to 20 carbons, and in the alkylene, at least one piece of —CH$_2$— may be replaced by —O—, —COO—, —OCO—, —CH=CH— or —CH≡CH—, and
- PG is independently a functional group represented by any one of formula (PG-1) to formula (PG-9):

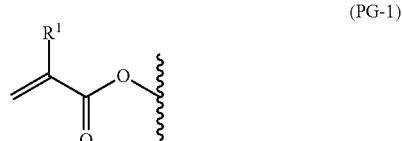
(PG-1)

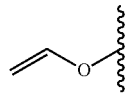
(PG-2)

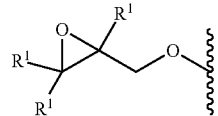
(PG-3)

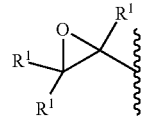
(PG-4)

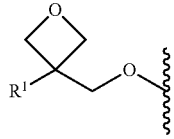
(PG-5)

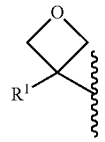
(PG-6)

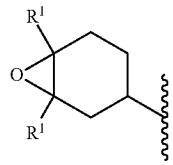
(PG-7)

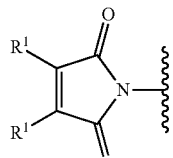
(PG-8)

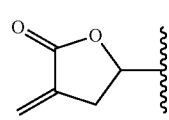
(PG-9)

wherein, in formula (PG-1) to formula (PG-9), $R^1$ is independently hydrogen, halogen, methyl, ethyl or trifluoromethyl.

2. The polymerizable liquid crystal compound according to claim 1, wherein at least one of $W^1$ is alkyl having 1 to 5 carbons, and at least one of $Z^1$ is —CH$_2$CH$_2$COO— or —OCOCH$_2$CH$_2$—.

3. The polymerizable liquid crystal compound according to claim 1, wherein PG is a functional group represented by formula (PG-1).

4. The polymerizable liquid crystal compound according to claim 1, wherein at least one of $Z^1$ is —CH$_2$CH$_2$COO—, and at least one of $Z^1$ is —OCOCH$_2$CH$_2$—.

5. A polymerizable liquid crystal composition, containing the polymerizable liquid crystal compound according to claim 1.

6. The polymerizable liquid crystal composition according to claim 5, containing 5 to 70 parts by weight of a polymerizable liquid crystal compound represented by formula (1) when the total amount of the polymerizable liquid crystal compound in a polymerizable liquid crystal composition is taken as 100 parts by weight.

7. A liquid crystal polymer, obtained by curing the polymerizable liquid crystal composition according to claim 5.

8. The liquid crystal polymer according to claim 7, wherein liquid crystal molecules were immobilized in a state in which the liquid crystal molecules are aligned by a photoalignment film.

9. A phase difference film, comprising the liquid crystal polymer according to claim 7.

10. A display device, having the liquid crystal polymer according to claim 7.

* * * * *